(12) United States Patent
Brunelle et al.

(10) Patent No.: US 7,714,095 B2
(45) Date of Patent: May 11, 2010

(54) PHASE TRANSFER CATALYZED METHOD FOR PREPARATION OF POLYETHERIMIDES

(75) Inventors: Daniel Joseph Brunelle, Burnt Hills, NY (US); Havva Yagci Acar, Istanbul (TR); Farid Fouad Khouri, Clifton Park, NY (US); Thomas Link Guggenheim, Mt. Vernon, IN (US); David Winfield Woodruff, Saratoga Springs, NY (US); Norman Enoch Johnson, Mt. Vernon, IN (US)

(73) Assignee: Sabic Innovative Plastics IP B.V. (NL)

( * ) Notice: Subject to any disclaimer, the term of this patent is extended or adjusted under 35 U.S.C. 154(b) by 1016 days.

(21) Appl. No.: 11/363,681

(22) Filed: Feb. 28, 2006

(65) Prior Publication Data
US 2006/0173158 A1 Aug. 3, 2006

Related U.S. Application Data

(63) Continuation-in-part of application No. 10/647,889, filed on Aug. 25, 2003, now abandoned.

(51) Int. Cl.
*C08G 73/00* (2006.01)
*C08G 73/10* (2006.01)
*C08G 8/02* (2006.01)
*C08G 14/00* (2006.01)

(52) U.S. Cl. .................... 528/322; 528/310; 528/125; 528/126; 528/128; 528/170; 528/171; 528/173; 528/183; 528/219; 528/422; 528/425; 546/256; 546/304

(58) Field of Classification Search ................ 528/322, 528/310, 125, 126, 128, 170, 171, 173, 183, 528/219, 422, 425; 546/256, 304
See application file for complete search history.

(56) References Cited

U.S. PATENT DOCUMENTS 2,991,273 A 7/1961 Hechelhammer et al.

(Continued)

FOREIGN PATENT DOCUMENTS

EP 0634437 A1 1/1995

(Continued)

OTHER PUBLICATIONS

International Search Report for PCT/US2007/003560 (Reference No. RD122897-11) International Filing Date Sep. 2, 2007, Mailing Date Jan. 10, 2007 (6 pages).

(Continued)

*Primary Examiner*—Duc Troung
(74) *Attorney, Agent, or Firm*—Cantor Colburn LLP

(57) ABSTRACT

Polyether polymers, such as polyetherimides, are prepared by the reaction of a dihydroxy-substituted aromatic hydrocarbon alkali metal salt, such as bisphenol A disodium salt, with a bis(N-(chlorophthalimido))aromatic compound, such as 1,3- and/or 1,4-bis(N-(4-chlorophthalimido))benzene, in a solvent such as o-dichlorobenzene and in the presence of a phase transfer catalyst such as a hexaalkylguanidinium chloride. Several embodiments may be employed to improve the method. They comprise employing substantially dry reagents, employing a high solids level in solvent, beginning with an excess of bis(N-(chlorophthalimido))-aromatic compound and incrementally adding alkali metal salt, employing alkali metal salt of small particle size, and using reagents of high purity.

31 Claims, 7 Drawing Sheets

U.S. PATENT DOCUMENTS

| | | |
|---|---|---|
| 2,999,835 A | 9/1961 | Goldberg |
| 3,028,365 A | 4/1962 | Schnell et al. |
| 3,148,172 A | 9/1964 | Fox |
| 3,271,367 A | 9/1966 | Schnell et al. |
| 3,271,368 A | 9/1966 | Goldberg et al. |
| 3,787,364 A | 1/1974 | Wirth et al. |
| 3,838,097 A | 9/1974 | Wirth et al. |
| 3,847,869 A | 11/1974 | Williams |
| 3,852,242 A | 12/1974 | White |
| 4,217,438 A | 8/1980 | Brunelle et al. |
| 4,273,712 A | 6/1981 | Williams, III |
| 4,460,778 A | 7/1984 | Brunelle |
| 4,546,207 A | 10/1985 | Mendiratta et al. |
| 4,595,760 A | 6/1986 | Brunelle |
| 4,642,327 A | 2/1987 | Matzner et al. |
| 4,870,155 A | 9/1989 | Matzner et al. |
| 5,116,975 A | 5/1992 | Brunelle |
| 5,132,423 A | 7/1992 | Brunelle et al. |
| 5,229,482 A | 7/1993 | Brunelle |
| 5,514,813 A | 5/1996 | Brunelle |
| 5,663,275 A | 9/1997 | Schmidhauser |
| 5,830,974 A | 11/1998 | Schmidhauser et al. |
| 5,856,421 A | 1/1999 | Schmidhauser |
| 5,908,915 A | 6/1999 | Brunelle |
| 6,008,374 A | 12/1999 | Dellacoletta et al. |
| 6,020,456 A | 2/2000 | Brunelle et al. |
| 6,235,934 B1 | 5/2001 | Caringi et al. |
| 6,265,521 B1 | 7/2001 | Fyvie et al. |
| 2005/0049390 A1 | 3/2005 | Brunelle et al. |

FOREIGN PATENT DOCUMENTS

| | | |
|---|---|---|
| EP | 0784051 A1 | 7/1997 |
| EP | 0859022 A1 | 8/1998 |
| EP | 0908485 A2 | 4/1999 |
| GB | 1 392 649 | 4/1975 |
| GB | 2 280 183 | 1/1995 |

OTHER PUBLICATIONS

Written Opinion of the International Searching Authority for PCT/US2007/003560 (Reference No. RD122897-11) International Filing Date Sep. 2, 2007, Mailing Date Jan. 10, 2007 (6 pages).

International Search Report for PCT/US2004/025799 (Reference No. RD 122897) International Filing Date Oct. 8, 2004, Mailing Date Feb. 15, 2005 (9 pages).

Written Opinion of the International Searching Authority for PCT/US2004/025799 (Reference No. RD 122897) International Filing Date Oct. 8, 2004, Mailing Date Feb. 15, 2005 (22 pages).

PHASE TRANSFER CATALYZED METHOD FOR PREPARATION OF POLYETHERIMIDES

RELATED APPLICATION

This application is a continuation-in-part of U.S. application Ser. No. 10/647,889 filed on Aug. 25, 2003 now abandoned.

BACKGROUND OF INVENTION

This invention relates to the preparation of polyether polymers and more particularly to an improved method for such preparation in a phase transfer catalyzed reaction. In a particular embodiment the invention relates to the preparation of polyetherimides in a phase transfer catalyzed reaction.

Polyetherimides have become an important genus of engineering resins because of their excellent properties. Conventionally, they have been prepared by the reaction of an aromatic diamine with an aromatic dianhydride. This method, however, has a disadvantage in that it requires many steps for preparation of the dianhydride, including, for example, the conversion of phthalic anhydride to an N-alkylimide, nitration of said N-alkylimide, displacement of the nitro group with an alkali metal salt of a dihydroxy-substituted aromatic hydrocarbon and an exchange reaction with phthalic anhydride to afford the dianhydride.

It has also long been known to prepare polyetherimides by a displacement reaction of an alkali metal salt of a dihydroxy-substituted aromatic hydrocarbon with an aromatic bis(substituted phthalimide). As originally developed, this reaction required the use of expensive dipolar aprotic solvents and the product tended to develop color and be contaminated with various by-products.

U.S. Pat. No. 5,229,482 discloses a displacement method for the preparation of polyetherimides from bis(chlorophthalimides) using a solvent of low polarity such as o-dichlorobenzene, in the presence of a thermally stable phase transfer catalyst such as a hexaalkylguanidinium halide. U.S. Pat. No. 5,830,974 discloses a similar method using a monoalkoxybenzene such as anisole as solvent. These methods made it possible, for the first time, to envision the commercial production of polyetherimides by the displacement method.

Nevertheless, several problems remain to be solved for the optimum development of the displacement reaction for polyetherimide preparation. First, there has been no method for control of molecular weight of the product, other than limiting reaction time. Second, the amount of phase transfer catalyst required for polyetherimide preparation in substantial yield is high, typically on the order of 5 mole percent based on bis(chlorophthalimide). Third, the product typically contains relatively large proportions, typically 8-10% by weight, of cyclic oligomers. While the preparation and ring-opening polymerization of cyclic polyetherimide oligomers may be a useful alternative to other polymerization methods, the presence of such oligomers as by-products in the linear polymer can adversely affect its properties and increase its polydispersity (Mw/Mn). Fourth, endcapping methods that might minimize problems resulting from the presence of reactive end groups have not been known. Fifth, the effects of such variables as impurity level and stoichiometric imbalance of the reagents have been unknown.

It is of interest, therefore, to continue development of the displacement method of polyetherimide preparation and optimize the same.

SUMMARY OF INVENTION

The present invention is based on a series of studies that identified several variables in the displacement process and led to the discovery of optimal conditions therefor.

In one embodiment the invention is a method for preparing an aromatic polyether polymer which comprises contacting, in a solvent of low polarity, substantially equimolar amounts of at least one alkali metal salt of a dihydroxy-substituted aromatic hydrocarbon and at least one bis((N-(chlorophthalimido))-aromatic compound, in the presence of a phase transfer catalyst which is substantially stable at the temperatures employed; said method further comprising at least one of the following embodiments:

(A) employing substantially dry solvent, alkali metal salt and bis(N-(chlorophthalimido))aromatic compound such that the reaction mixture comprising the same contains at most about 20 ppm by weight of water;

(B) starting the reaction by addition of phase transfer catalyst wherein the polymer solids level in said solvent is at a value of at least about 15% and then concentrating the mixture during reaction until the said value is in the range of between about 25% polymer solids level and about 60% polymer solids level;

(C) maintaining the combined level of said alkali metal salt and bis(N-(chlorophthalimido))aromatic compound in said solvent at a value in the range of between about 25% polymer solids level and about 60% polymer solids level;

(D) beginning said contact using a molar excess of said bis(N-(chlorophthalimido))aromatic compound up to about 5% and subsequently adding alkali metal salt at least once to afford a polyether polymer of a desired molecular weight;

(E) employing alkali metal salt having less than about 25% of particles with a diameter of greater than about 200 microns; and (F) employing at least one of
  (1) an alkali metal salt which is stoichiometrically pure or contains at most about 0.3 mole % of free dihydroxy-substituted aromatic hydrocarbon or of free sodium hydroxide, and
  (2) a bis(N-(chlorophthalimido))aromatic compound which is stoichiometrically pure or contains excess anhydride groups in a proportion up to 0.5 mole %, contains phthalides in a proportion no greater than about 1000 ppm, and contains chlorobenzoic acids in a proportion no greater than about 0.15 mole %.

Thus in one embodiment, the present invention provides a method for preparing an aromatic polyether polymer which comprises contacting, in a solvent of low polarity, substantially equimolar amounts of at least one alkali metal salt of a dihydroxy-substituted aromatic hydrocarbon and at least one bis((N-(chlorophthalimido))aromatic compound, in the presence of a phase transfer catalyst which is substantially stable at the temperatures employed; wherein said at least one alkali metal salt of a dihydroxy-substituted aromatic hydrocarbon has less than about 25% of particles with a diameter of greater than about 200 microns.

In another embodiment, the present invention provides a method for preparing an aromatic polyether polymer which comprises contacting, in a solvent of low polarity, substantially equimolar amounts of at least one alkali metal salt of a dihydroxy-substituted aromatic hydrocarbon and at least one bis((N-(chlorophthalimido))aromatic compound in the presence of a phase transfer catalyst which is substantially stable at the temperatures employed, wherein said at least one alkali metal salt of a dihydroxy-substituted aromatic hydrocarbon is the disodium salt of bisphenol A having less than about 25% of particles with a diameter of greater than about 200 microns, and wherein said at least one bis((N-(chlorophthalimido)) aromatic compound is selected from the group consisting of 1,3- and 1,4-bis(N-(4-chlorophthalimido))benzene; 1,3- and 1,4-bis(N-(3-chlorophthalimido))benzene; 1,3- and 1,4-(N-(3-chlorophthalimido))-(N-(4-chlorophthalimido))benzene; 3,3'-, 3,4'- and 4,4'-bis(N-(3-chlorophthalimido))phenyl ether; 3,3'-, 3,4'- and 4,4'-bis(N-(4-chlorophthalimido))phenyl ether; and 3,3'-, 3,4'- and 4,4'-(N-(3-chlorophthalimido))-(N-(4-chlorophthalimido))phenyl ether.

In yet another embodiment, the present invention provides a method for preparing an aromatic polyether polymer which comprises contacting, in orthodichlorobenzene, substantially equimolar amounts of the disodium salt of bisphenol A having less than about 25% of particles with a diameter of greater than about 200 microns, and a bis((N-(chlorophthalimido)) aromatic composition comprising 1,3- and 1,4-bis(N-(4-chlorophthalimido))benzene in the presence of hexaethylguanidinium chloride phase transfer catalyst.

Various other features, aspects, and advantages of the present invention will become more apparent with reference to the following description and appended claims.

DETAILED DESCRIPTION

Figure 1:
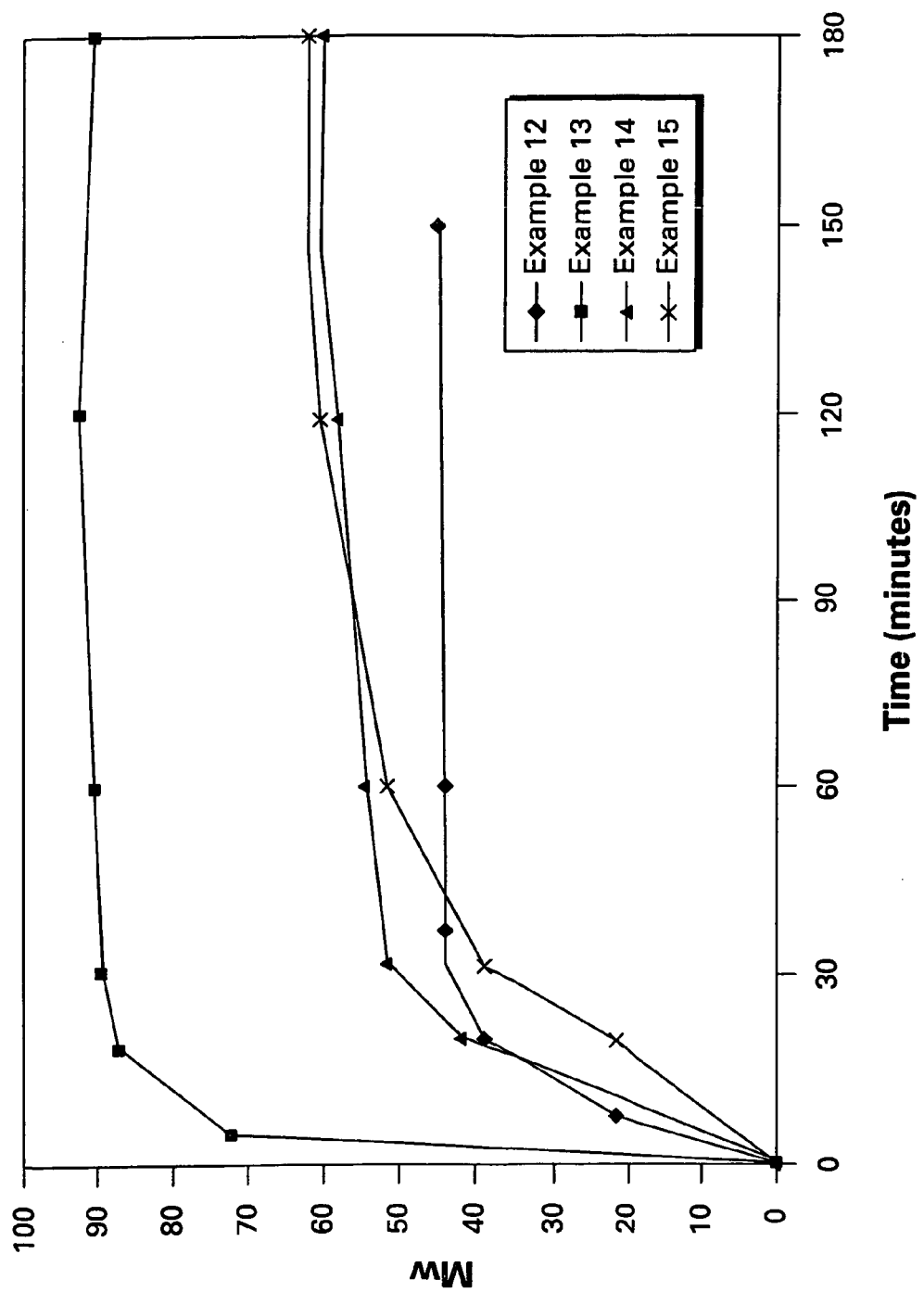
FIGS. 1-6 are graphical representations of the results of Examples 12-15 and 17-25. Molecular weights in FIGS. 1-6, read along the y-axes of the graphs, are in kg/mole; that is, they are conventional molecular weights in g/mole divided by 1,000.

The alkali metal salts of dihydroxy-substituted aromatic hydrocarbons which are employed in the present invention are typically sodium or potassium salts. Sodium salts are often used in particular embodiments by reason of their availability and relatively low cost.

Suitable dihydroxy-substituted aromatic hydrocarbons include those represented by the formula (I):

wherein D is a divalent aromatic radical. In some embodiments, D has the structure of formula (II):

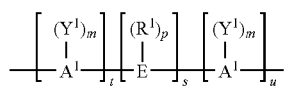

wherein $A^1$ represents an aromatic group including, but not limited to, phenylene, biphenylene, naphthylene, etc. In some embodiments E may be an alkylene or alkylidene group including, but not limited to, methylene, ethylene, ethylidene, propylene, propylidene, isopropylidene, butylene, butylidene, isobutylidene, amylene, amylidene, isoamylidene, etc. In other embodiments when E is an alkylene or alkylidene group, it may also consist of two or more alkylene or alkylidene groups connected by a moiety different from alkylene or alkylidene, including, but not limited to, an aromatic linkage; a tertiary nitrogen linkage; an ether linkage; a carbonyl linkage; a silicon-containing linkage, silane, siloxy; or a sulfur-containing linkage including, but not limited to, sulfide, sulfoxide, sulfone, etc.; or a phosphorus-containing linkage including, but not limited to, phosphinyl, phosphonyl, etc. In other embodiments E may be a cycloaliphatic group including, but not limited to, cyclopentylidene, cyclohexylidene, 3,3,5-trimethylcyclohexylidene, methylcyclohexylidene, 2-(2.2.1)-bicycloheptylidene, neopentylidene, cyclopentadecylidene, cyclododecylidene, adamantylidene, etc.; a sulfur-containing linkage, including, but not limited to, sulfide, sulfoxide or sulfone; a phosphorus-containing linkage, including, but not limited to, phosphinyl or phosphonyl; an ether linkage; a carbonyl group; a tertiary nitrogen group; or a silicon-containing linkage including, but not limited to, silane or siloxy. $R^1$ represents hydrogen or a monovalent hydrocarbon group including, but not limited to, alkenyl, allyl, alkyl, aryl, aralkyl, alkaryl, or cycloalkyl. In various embodiments a monovalent hydrocarbon group of $R^1$ may be halogen-substituted, particularly fluoro- or chloro-substituted, for example as in dichloroalkylidene, particularly gem-dichloroalkylidene. $Y^1$ independently at each occurrence may be an inorganic atom including, but not limited to, halogen (fluorine, bromine, chlorine, iodine); an inorganic group containing more than one inorganic atom including, but not limited to, nitro; an organic group including, but not limited to, a monovalent hydrocarbon group including, but not limited to, alkenyl, allyl, alkyl, aryl, aralkyl, alkaryl, or cycloalkyl, or an oxy group including, but not limited to, $OR^2$ wherein $R^2$ is a monovalent hydrocarbon group including, but not limited to, alkyl, aryl, aralkyl, alkaryl, or cycloalkyl; it being only necessary that $Y^1$ be inert to and unaffected by the reactants and reaction conditions used to prepare the polymer. In some particular embodiments $Y^1$ comprises a halo group or $C_1$-$C_6$ alkyl group. The letter "m" represents any integer from and including zero through the number of positions on $A^1$ available for substitution; "p" represents an integer from and including zero through the number of positions on E available for substitution; "t" represents an integer equal to at least one; "s" represents an integer equal to either zero or one; and "u" represents any integer including zero.

In dihydroxy-substituted aromatic hydrocarbons in which D is represented by formula (II) above, when more than one $Y^1$ substituent is present, they may be the same or different. The same holds true for the $R^1$ substituent. Where "s" is zero in formula (II) and "u" is not zero, the aromatic rings are directly joined by a covalent bond with no intervening alkylidene or other bridge. The positions of the hydroxyl groups and $Y^1$ on the aromatic nuclear residues $A^1$ can be varied in the ortho, meta, or para positions and the groupings can be in vicinal, asymmetrical or symmetrical relationship, where two or more ring carbon atoms of the hydrocarbon residue are substituted with $Y^1$ and hydroxyl groups. In some particular embodiments the parameters "t", "s", and "u" each have the value of one; both $A^1$ radicals are unsubstituted phenylene radicals; and E is an alkylidene group such as isopropylidene. In some particular embodiments both $A^1$ radicals are p-phenylene, although both may be o- or m-phenylene or one o- or m-phenylene and the other p-phenylene.

In some embodiments of dihydroxy-substituted aromatic hydrocarbons E may be an unsaturated alkylidene group. Suitable dihydroxy-substituted aromatic hydrocarbons of this type include those of the formula (III):

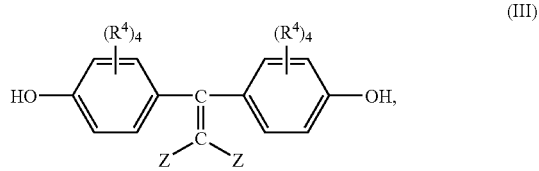

where independently each $R^4$ is hydrogen, chlorine, bromine or a $C_{1-30}$ monovalent hydrocarbon or hydrocarbonoxy group, each Z is hydrogen, chlorine or bromine, subject to the provision that at least one Z is chlorine or bromine.

Suitable dihydroxy-substituted aromatic hydrocarbons also include those of the formula (IV):

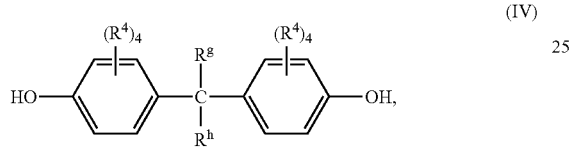

where independently each $R^4$ is as defined hereinbefore, and independently $R^g$ and $R^h$ are hydrogen or a $C_{1-30}$ hydrocarbon group.

In embodiments of the present invention dihydroxy-substituted aromatic hydrocarbons that may be used include those disclosed by name or formula (generic or specific) in U.S. Pat. Nos. 2,991,273, 2,999,835, 3,028,365, 3,148,172, 3,271,367, 3,271,368, and 4,217,438. In some embodiments of the invention dihydroxy-substituted aromatic hydrocarbons include 4,4'-(3,3,5-trimethylcyclohexylidene)diphenol; 4,4'-bis(3,5-dimethyl)diphenol, 1,1-bis(4-hydroxy-3-methylphenyl)cyclohexane; 4,4-bis(4-hydroxyphenyl)heptane; 2,4'-dihydroxydiphenylmethane; bis(2-hydroxyphenyl) methane; bis(4-hydroxyphenyl)methane; bis(4-hydroxy-5-nitrophenyl)methane; bis(4-hydroxy-2,6-dimethyl-3-methoxyphenyl)methane; 1,1-bis(4-hydroxyphenyl)ethane; 1,2-bis(4-hydroxyphenyl)ethane; 1,1-bis(4-hydroxy-2-chlorophenyl)ethane; 2,2-bis(4-hydroxyphenyl)propane (commonly known as bisphenol A); 2,2-bis(3-phenyl-4-hydroxyphenyl)propane; 2,2-bis(4-hydroxy-3-methylphenyl) propane; 2,2-bis(4-hydroxy-3-ethylphenyl)propane; 2,2-bis (4-hydroxy-3-isopropylphenyl)propane; 2,2-bis(4-hydroxy-3,5-dimethylphenyl)propane; 3,5,3',5'-tetrachloro-4,4'-dihydroxyphenyl)propane; bis(4-hydroxyphenyl) cyclohexylmethane; 2,2-bis(4-hydroxyphenyl)-1-phenylpropane; 2,4'-dihydroxyphenyl sulfone; dihydroxy naphthalene; 2,6-dihydroxy naphthalene; hydroquinone; resorcinol; $C_{1-3}$ alkyl-substituted resorcinols; 2,2-bis-(4-hydroxyphenyl)butane; 2,2-bis-(4-hydroxyphenyl)-2-methylbutane; 1,1-bis-(4-hydroxyphenyl)cyclohexane; bis-(4-hydroxyphenyl); bis-(4-hydroxyphenyl)sulphide; 2-(3-methyl-4-hydroxyphenyl-2-(4-hydroxyphenyl)propane; 2-(3,5-dimethyl-4-hydroxyphenyl)-2-(4-hydroxyphenyl)propane; 2-(3-methyl-4-hydroxyphenyl)-2-(3,5-dimethyl-4-hydroxyphenyl)propane; bis-(3,5-dimethylphenyl-4-hydroxyphenyl)methane; 1,1-bis-(3,5-dimethylphenyl-4-hydroxyphenyl)ethane; 2,2-bis-(3,5-dimethylphenyl-4-hydroxyphenyl) propane; 2,4-bis-(3,5-dimethylphenyl-4-hydroxyphenyl)-2-methylbutane; 3,3-bis-(3,5-dimethylphenyl-4-hydroxyphenyl)pentane; 1,1-bis-(3,5-dimethylphenyl-4-hydroxyphenyl)cyclopentane; 1,1-bis-(3,5-dimethylphenyl-4-hydroxyphenyl)cyclohexane; and bis-(3,5-dimethylphenyl-4-hydroxyphenyl)sulphide. In a particular embodiment the dihydroxy-substituted aromatic hydrocarbon comprises bisphenol A.

In some embodiments of dihydroxy-substituted aromatic hydrocarbons when E is an alkylene or alkylidene group, said group may be part of one or more fused rings attached to one or more aromatic groups bearing one hydroxy substituent. Suitable dihydroxy-substituted aromatic hydrocarbons of this type include those containing indane structural units such as represented by the formula (V), which compound is 3-(4-hydroxyphenyl)-1,1,3-trimethylindan-5-ol, and by the formula (VI), which compound is 1-(4-hydroxyphenyl)-1,3,3-trimethylindan-5-ol:

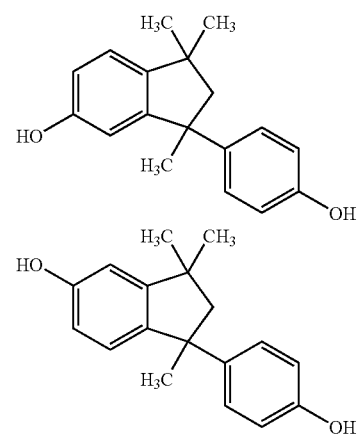

Also included among suitable dihydroxy-substituted aromatic hydrocarbons of the type comprising one or more alkylene or alkylidene groups as part of fused rings are the 2,2,2',2'-tetrahydro-1,1'-spirobi(1H-indene)diols having formula (VII):

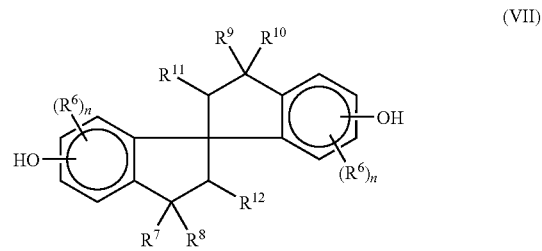

wherein each $R^6$ is independently selected from monovalent hydrocarbon radicals and halogen radicals; each $R^7$, $R^8$, $R^9$, and $R^{10}$ is independently $C_{1-6}$ alkyl; each $R^{11}$ and $R^{12}$ is independently H or $C_{1-6}$ alkyl; and each n is independently selected from positive integers having a value of from 0 to 3 inclusive. In a particular embodiment the 2,2,2',2'-tetrahydro-1,1'-spirobi(1H-indene)diol is 2,2,2',2'-tetrahydro-3,3,3',3'-tetramethyl-1,1'-spirobi(1H-indene)-6,6'-diol (sometimes known as "SBI"). Mixtures of alkali metal salts derived from mixtures of any of the foregoing dihydroxy-substituted aromatic hydrocarbons may also be employed.

The term "alkyl" as used in the various embodiments of the present invention is intended to designate both linear alkyl, branched alkyl, aralkyl, cycloalkyl, bicycloalkyl, tricycloalkyl and polycycloalkyl radicals containing carbon and hydrogen atoms, and optionally containing atoms in addition to carbon and hydrogen, for example atoms selected from Groups 15, 16 and 17 of the Periodic Table. The term "alkyl" also encompasses that alkyl portion of alkoxide groups. In various embodiments normal and branched alkyl radicals are those containing from 1 to about 32 carbon atoms, and include as illustrative non-limiting examples C1-C32 alkyl optionally substituted with one or more groups selected from C1-C32 alkyl, C3-C15 cycloalkyl or aryl; and C3-C15 cycloalkyl optionally substituted with one or more groups selected from C1-C32 alkyl. Some particular illustrative examples comprise methyl, ethyl, n-propyl, isopropyl, n-butyl, sec-butyl, tertiary-butyl, pentyl, neopentyl, hexyl, heptyl, octyl, nonyl, decyl, undecyl and dodecyl. Some illustrative non-limiting examples of cycloalkyl and bicycloalkyl radicals include cyclobutyl, cyclopentyl, cyclohexyl, methylcyclohexyl, cycloheptyl, bicycloheptyl and adamantyl. In various embodiments aralkyl radicals are those containing from 7 to about 14 carbon atoms; these include, but are not limited to, benzyl, phenylbutyl, phenylpropyl, and phenylethyl. In various embodiments aryl radicals used in the various embodiments of the present invention are those substituted or unsubstituted aryl radicals containing from 6 to 18 ring carbon atoms. Some illustrative non-limiting examples of these aryl radicals include C6-C15 aryl optionally substituted with one or more groups selected from C1-C32 alkyl, C3-C15 cycloalkyl or aryl. Some particular illustrative examples of aryl radicals comprise substituted or unsubstituted phenyl, biphenyl, toluyl and naphthyl.

Typical bis(N-(chlorophthalimido))aromatic compounds (hereinafter sometimes simply "bischlorophthalimides") employed according to the invention are prepared in various embodiments by reaction of a diamine with two equivalents of an anhydride and include, but are not limited to, those having the formula (VIII):

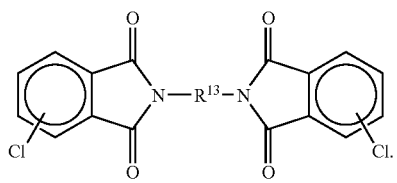

(VIII)

In various embodiments of the invention $R^{13}$ in formula (VIII) is derived from a diamine selected from the group consisting of aliphatic, aromatic, and heterocyclic diamines. Exemplary aliphatic moieties include, but are not limited to, straight-chain-, branched-, and cycloalkyl radicals, and their substituted derivatives. Straight-chain and branched alkyl radicals are typically those containing from 2 to 22 carbon atoms, and include as illustrative non-limiting examples ethyl, propyl, butyl, neopentyl, hexyl, dodecyl. Cycloalkyl radicals are typically those containing from 3 to 22 ring carbon atoms. Some illustrative non-limiting examples of cycloalkyl radicals include cyclobutyl, cyclopentyl, cyclohexyl, methylcyclohexyl, and cycloheptyl. In various embodiments the two amino groups in diamine-derived aliphatic moieties are separated from each other by at least two and sometimes by at least three carbon atoms. In particular embodiments for diamines, the two amino groups are in the alpha, omega positions of a straight-chain or branched alkyl radical, or their substituted derivatives; or in the 1,4-positions of a cycloalkyl radical or its substituted derivatives. In various embodiments substituents for said aliphatic moieties include one or more halogen groups, such as fluoro, chloro, or bromo, or mixtures thereof; or one or more aryl groups, such as phenyl groups, alkyl- or halogen-substituted phenyl groups, or mixtures thereof. In some embodiments substituents for aliphatic moieties, when present, are chloro or unsubstituted phenyl.

In other embodiments $R^{13}$ in formulas (VIII) comprises a divalent organic radical selected from aromatic hydrocarbon radicals having 6 to about 22 carbon atoms and substituted derivatives thereof. In various embodiments said aromatic hydrocarbon radicals may be monocyclic, polycyclic or fused.

In still other embodiments $R^{13}$ in formulas (VIII) comprises divalent aromatic hydrocarbon radicals of the general formula (IX)

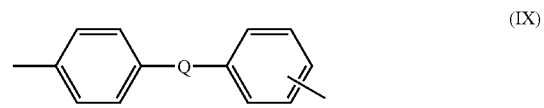

(IX)

wherein the unassigned positional isomer about the aromatic ring is either meta or para to Q, and Q is a covalent bond or a member selected from the group consisting of formulas (X):

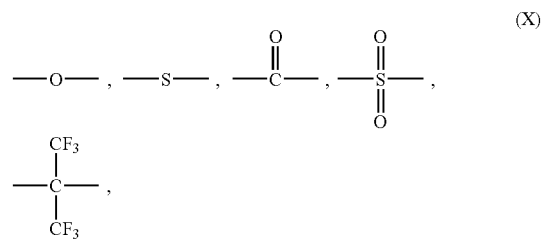

(X)

and an alkylene or alkylidene group of the formula $C_yH_{2y}$, wherein y is an integer from 1 to 5 inclusive. In some particular embodiments y has the value of one or two. Illustrative linking groups include, but are not limited to, methylene, ethylene, ethylidene, vinylidene, halogen-substituted vinylidene, and isopropylidene. In other particular embodiments the unassigned positional isomer about the aromatic ring in formula (IX) is para to Q.

In various embodiments the two amino groups in diamine-derived aromatic hydrocarbon radicals are separated by at least two and sometimes by at least three ring carbon atoms. When the amino group or groups are located in different aromatic rings of a polycyclic aromatic moiety, they are often separated from the direct linkage or from the linking moiety between any two aromatic rings by at least two and sometimes by at least three ring carbon atoms. Illustrative non-limiting examples of aromatic hydrocarbon radicals include phenyl, biphenyl, naphthyl, bis(phenyl)methane, bis(phenyl)-2,2-propane, and their substituted derivatives. In particular embodiments substituents include one or more halogen groups, such as fluoro, chloro, or bromo, or mixtures thereof; or one or more straight-chain-, branched-, or cycloalkyl groups having from 1 to 22 carbon atoms, such as methyl, ethyl, propyl, isopropyl, tert-butyl, or mixtures thereof. In particular embodiments substituents for aromatic hydrocarbon radicals, when present, are at least one of chloro, methyl, ethyl or mixtures thereof. In other particular embodiments said aromatic hydrocarbon radicals are unsubstituted. In some particular embodiments diamines from which $R^1$ may be derived include, but are not limited to, meta-phenylenediamine; para-phenylenediamine; mixtures of meta- and para-phenylenediamine; isomeric 2-methyl- and 5-methyl-4,6-diethyl-1,3-phenylene-diamines or their mixtures; bis(4-aminophenyl)-2,2-propane; bis(2-chloro-4-amino-3,5-diethylphenyl)methane, 4,4'-diaminodiphenyl, 3,4'-diaminodiphenyl, 4,4'-diaminodiphenyl ether, 3,4'-diaminodiphenyl ether, 4,4'-diaminodiphenyl sulfone, 3,4'-diaminodiphenyl sulfone, 4,4'-diaminodiphenyl ketone, 3,4'-diaminodiphenyl ketone, and 2,4-toluenediamine. Mixtures of diamines may also be employed.

In particular embodiments bischlorophthalimides of formula (VIII) comprise 1,3- and 1,4-bis(N-(4-chlorophthalimido))benzene; 1,3- and 1,4-bis(N-(3-chlorophthalimido))benzene; 1,3- and 1,4-(N-(3-chlorophthalimido))-(N-(4-chlorophthalimido))benzene; 3,3'-, 3,4'- and 4,4'-bis(N-(3-chlorophthalimido))phenyl ether; 3,3'-, 3,4'- and 4,4'-bis(N-(4-chlorophthalimido))phenyl ether; and 3,3'-, 3,4'- and 4,4'-(N-(3-chlorophthalimido))-(N-(4-chlorophthalimido)) phenyl ether. Mixtures of compounds of the formula (VIII) may also be employed.

It is within the scope of the invention to employ the compound of formula (VIII) in admixture with other bis(halo) compounds including, but not limited to, bis(4-fluorophenyl) sulfone, bis(4-fluorophenyl) ketone and the corresponding chloro compounds. In that event, the polyetherimide obtained as a product will be a copolymer also containing ether sulfone or ether ketone structural units, of the type whose structure and preparation are disclosed in U.S. Pat. No. 5,908,915.

There may also, optionally, be present at least one chain termination agent, hereinafter sometimes "CTA". Suitable chain termination agents include, but are not limited to, all those with an activated substituent suitable for displacement by a phenoxide group during the polymerization process. In various embodiments suitable chain termination agents include, but are not limited to, alkyl halides such as alkyl chlorides, and aryl halides including, but not limited to, chlorides of formulas (XI) and (XII):

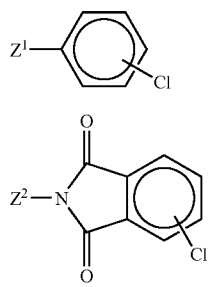

(XI)

(XII)

wherein the chlorine substituent is in the 3- or 4-position, and $Z^1$ and $Z^2$ comprise a substituted or unsubstituted alkyl or aryl group. In some embodiments suitable chain termination agents of formula (XI) comprise monochlorobenzophenone or monochlorodiphenylsulfone. In some embodiments suitable chain termination agents of formula (XII) comprise at least one mono-substituted mono-phthalimide including, but not limited to, a monochlorophthalimide such as 4-chloro-N-methylphthalimide, 4-chloro-N-butylphthalimide, 4-chloro-N-octadecylphthalimide, 3-chloro-N-methylphthalimide, 3-chloro-N-butylphthalimide, 3-chloro-N-octadecylphthalimide, 4-chloro-N-phenylphthalimide or 3-chloro-N-phenylphthalimide. In other embodiments suitable chain termination agents of formula (XII) comprise at least one mono-substituted bis-phthalimide including, but not limited to, a monochlorobisphthalimidobenzene including, but not limited to, 1-(N-(4-chlorophthalimido))-3-(N-phthalimido)benzene (as in formula (XIII)) or 1-(N-(3-chlorophthalimido))-3-(N-phthalimido)benzene (as in formula (XIV)), the latter CTA's often in admixture with the analogous bis(chloro-N-phthalimido)benzene monomer.

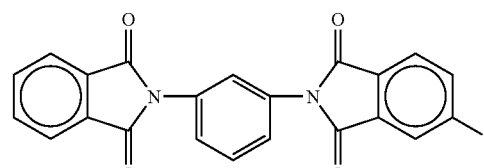

(XIII)

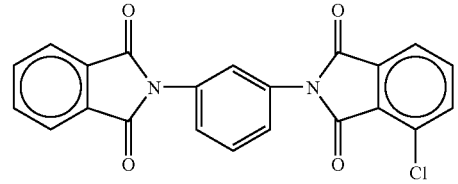

(XIV)

In still other embodiments suitable chain termination agents of formula (XII) comprise other mono-substituted, bisphthalimido compounds including, but not limited to, monochlorobisphthalimidodiphenyl sulfone, monochlorobisphthalimidodiphenyl ketone, and monochlorobisphthalimidophenyl ethers including, but not limited to, 4-(N-(4-chlorophthalimido))phenyl-4'-(N-phthalimido)phenyl ether (as in formula (XV)), or 4-(N-(3-chlorophthalimido)phenyl)-4'-(N-phthalimido)phenyl ether (as in formula (XVI)), or the corresponding isomers derived from 3,4'-diaminodiphenyl ether.

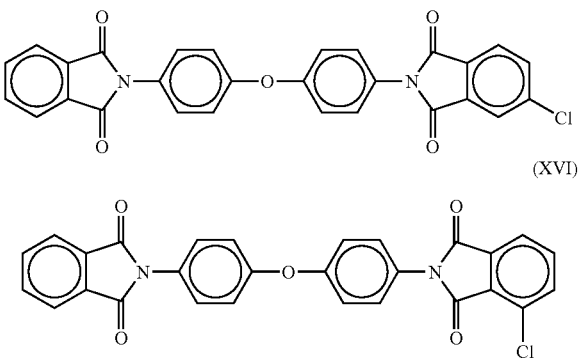

(XV)

(XVI)

Chain termination agents may optionally be in admixture with bis-substituted bis(phthalimide) monomers. In one embodiment mono-substituted bis-phthalimide chain termination agents may optionally be in admixture with bis-substituted bis-phthalimide monomers. In a particular embodiment monochlorobisphthalimidophenyl ether chain termination agents may often be in admixture with at least one bis-substituted (N-phthalimido)phenyl ether including, but not limited to, at least one bis(chloro-N-phthalimido)phenyl ether.

Also present in embodiments of the invention is at least one solvent of low polarity, usually substantially lower in polarity than that of the dipolar aprotic solvents previously employed for the preparation of aromatic polyetherimides. In various embodiments said solvent has a boiling point above about 150° C., in order to facilitate the reaction which typically requires temperatures in the range of between about 125° C. and about 250° C. Suitable solvents of this type include, but are not limited to, ortho-dichlorobenzene, para-dichlorobenzene, dichlorotoluene, 1,2,4-trichlorobenzene, diphenyl sulfone, phenetole, anisole and veratrole, and mixtures thereof.

Another feature of the invention is the presence of a phase transfer catalyst (hereinafter sometimes "PTC"). In some embodiments the PTC is substantially stable over the reaction temperature range, which range includes but is not limited to, temperatures in the range of between about 125° C. and about 250° C. Substantially stable in the present context means that the PTC is sufficiently stable to effect the desired reaction at a desired rate. Various types of PTC's may be employed for this purpose. They include quaternary phosphonium salts of the type disclosed in U.S. Pat. No. 4,273,712; N-alkyl-4-dialkylaminopyridinium salts of the type disclosed in U.S. Pat. Nos. 4,460,778 and 4,595,760; and guanidinium salts of the type disclosed in U.S. Pat. Nos. 5,132,423 and 5,116,975. In some particular embodiments suitable phase transfer catalysts, by reason of their exceptional stability at high temperatures and their effectiveness to produce high molecular weight aromatic polyether polymers in high yield are alpha-omega-bis(pentaalkylguanidinium)alkane salts and hexaalkylguanidinium salts including, but not limited to, hexaalkylguanidinium halides and especially hexaalkylguanidinium chlorides as disclosed, for example, in U.S. Pat. No. 5,229,482.

There are various embodiments of the present invention that can be used individually or in any combination. For each embodiment, the relevant parameters will be defined immediately hereinafter. Then the broad parameters, applicable generically except as dictated by one of the embodiments, will be delineated.

In embodiment A, the reagents (alkali metal salt, bischlorophthalimide and solvent) employed are substantially dry; i.e., the reaction mixture comprising the same contains at most about 20 ppm by weight of water. In some particular embodiments the amount of water in the reaction mixture is less than about 20 ppm, in other embodiments less than about 15 ppm, and in still other embodiments less than about 10 ppm. The proportion of water may be determined by any convenient means and is typically determined by Karl Fischer titration. In some embodiments the amount of water in the reaction mixture is determined indirectly by measuring water content of an over-head distillate or condensate.

In a particular subset of this embodiment, the alkali metal salt, in combination with a portion of solvent, is dried, most often by distillation, in one embodiment to a water content of at most about 20 ppm, and in another embodiment to a water content of at most about 10 ppm. Bischlorophthalimide, in combination with a portion of solvent and optionally with chain termination agent, is similarly dried in one embodiment to a water content of at most about 20 ppm, and in another embodiment to a water content of at most about 10 ppm. This form of drying is generally and typically applicable to embodiment A, although other effective forms may be employed. It is within the scope of the invention to pre-dry the solvent, e.g., by contact with molecular sieves.

In another particular subset of this embodiment (embodiment A1), the two reagents, alkali metal salt and bischlorophthalimide, may then be combined and, optionally, further dried by distillation until the threshold value of about 20 ppm water or less is attained. Dry PTC is then added, whereupon reaction immediately begins at a temperature on the order of about 190° C. PTC may be added all at once or in portions over time. In one particular embodiment PTC is added continuously over a period of time to moderate the reaction exotherm. In the present context dry PTC means that in one embodiment the catalyst contains less than about 50 ppm water, in another embodiment the catalyst contains less than about 30 ppm water, and in still another embodiment the catalyst contains less than about 20 ppm water. A substantially greater reaction rate, as shown by the slope of the curve of molecular weight attainment after a given time, is noted when embodiment A is employed than when reagents containing a higher proportion of water are employed.

In another particular subset of embodiment A (embodiment A2), bischlorophthalimide, all or at least a portion of solvent and all or at least a portion of PTC, optionally predried separately, may be combined and, if necessary, further dried by distillation until the threshold value of about 20 ppm water or less is attained. Dry alkali metal salt is then added, whereupon reaction immediately begins, typically at solvent reflux temperature. Dry alkali metal salt may be added all at once or in portions over time. In the present context dry alkali metal salt means that in various embodiments the salt contains less than about 50 ppm water, or less than about 30 ppm water, or less than about 25 ppm water, or preferably less than about 20 ppm water. In one particular embodiment dry alkali metal salt is added continuously over a period of time to moderate the reaction exotherm. The reaction may be performed at an initial solids level of at least about 15%, or at a solids level in a range of between about 15% and about 35%, or at a solids level in a range of between about 25% and about 30%. In some embodiments the reaction is performed at an initial solids level and then the mixture is concentrated to a higher solids level during reaction or after all the salt has been added or both during reaction and after all the salt has been added. The final solids level following complete addition of salt and any optional concentration step may be at least about 15%, or in a range of between about 15% and about 35%, or in a range of between about 25% and about 30%.

In another particular subset of embodiment A, a portion of solvent is removed from the reaction vessel by distillation during the course of reaction, and, optionally, dry solvent is added to make up for that solvent removed. In some embodiments the solvent is ortho-dichlorobenzene dried to a level of at most 20 ppm water before addition to the reaction mixture.

Embodiment B relates to starting the reaction by addition of phase transfer catalyst to a mixture comprising said alkali metal salt and bis(N-(chlorophthalimido))aromatic compound in solvent wherein the solids level of polymer is at an initial value of at least about 15%, and then concentrating the mixture during reaction. In another embodiment the solids level of polymer is at an initial value of at least about 25% before starting the reaction by addition of phase transfer catalyst. In various embodiments following addition of phase transfer catalyst the mixture is concentrated until the said value is in one embodiment in a range of between about 25% polymer solids level and about 60% polymer solids level; in another embodiment in a range of between about 25% polymer solids level and about 50% polymer solids level; in still another embodiment in a range of between about 25% polymer solids level and about 40% polymer solids level; and in still another embodiment in a range of between about 30% polymer solids level and about 40% polymer solids level. Solids level (sometimes also referred to herein as "polymer solids level") is calculated as weight polymer that would be formed divided by the sum of weight polymer than would be formed and solvent. Concentration of the reaction mixture may be done by any convenient method including, but not limited to, distillation of solvent. PTC may be added all at once or in portions over time. In one particular embodiment PTC is added continuously over a period of time to moderate the reaction exotherm.

Embodiment C relates to the combined level of alkali metal salt and bischlorophthalimide reagents in solvent. Said combined level is maintained at a value in one embodiment in a range of between about 25% polymer solids level and about 60% polymer solids level; in another embodiment in a range of between about 25% polymer solids level and about 50% polymer solids level; in another embodiment in a range of between about 25% polymer solids level and about 40% polymer solids level, and in still another embodiment in a range of between about 30% polymer solids level and about 40% polymer solids level. Previously, values of 10-15% solids level were most often employed.

At least two unexpected advantages of these relatively high solids levels have been observed. In the first place, the proportion of cyclic oligomers relative to polymer is substantially reduced, particularly in mixtures of 3- and 4-chlorophthalimide isomers. Cyclic oligomer levels are in one embodiment less than about 5 wt. %, in another embodiment less than about 4 wt. %, in another embodiment less than about 3 wt. %, and in still another embodiment less than about 2 wt. %, based on weight polymer. Cyclics proportions may be determined by gel permeation chromatography using a suitable column; for example, a Polymer Labs Mixed E column, which separates materials of low molecular weight. In the second place, the reaction rate and efficiency of the PTC is substantially improved.

Whereas total cyclic oligomers, using o-dichlorobenzene as solvent, in polyetherimides prepared from bisphenol A salts and mixtures of 1,3-bis(N-(4-chlorophthalimido))benzene and 1,3-bis(N-(3-chlorophthalimido))-benzene in proportions (weight and mole, interchangeably) from 3:1 to 0:1 reached values on the order of 5% by weight at 15% of solids level in o-dichlorobenzene, the values at solids levels of 25-30% ranged from about 1.1% to about 2.1% by weight (calculated as weight cyclics divided by the sum of weight polymer and weight cyclics). Likewise, product molecular weights attained at a PTC level in some embodiments of 0.6-1.3 mole percent (based on alkali metal salt) and in other embodiments of 1.0-1.3 mole percent (based on alkali metal salt) and a solids level of 22% were greater, particularly in reaction times of 60 minutes or greater, than those attained at a PTC level of 1.8 mole percent and a solids level of 15%. In some embodiments wherein lower catalyst levels are used at higher solids level, it is believed that less catalyst degradation occurs which may also account at least in part for attainment of higher product molecular weight.

Embodiment D is a refinement of a method for rough control of molecular weight of the polyetherimide product. Previously, a slow approach to the desired molecular weight was achieved by initially employing an excess of bischlorophthalimide, said excess typically being provided by introducing only on the order of 70% of the stoichiometric amount of alkali metal salt. After the reaction reached a plateau, the molecular weight of the polyetherimide was determined and additional alkali metal salt was introduced. After several repetitions of this procedure, the desired molecular weight was reached and the reaction was stopped.

One effect of this gradual approach was the necessity to use a rather large amount of PTC. It was discovered that this was, at least in part, a result of the instability of the PTC in the presence of phenoxide-type anions at high temperatures. Another effect was an undesirably long total reaction time, since many iterations of alkali metal salt addition and molecular weight determination, sometimes requiring a total reaction time of 8-10 hours, were required before the desired molecular weight was attained.

In embodiment D, therefore, the initial excess of bischlorophthalimide is only up to about 5% on a molar basis. In one particular embodiment the initial excess of bischlorophthalimide is in the range of between about 0.75% and about 3%, and in another particular embodiment in the range of between about 0.75% and about 1.25% on a molar basis. The weight average molecular weight of the initial polyetherimide obtained is then generally in the range of between about 25,000 and about 37,000, depending on the presence and amount, if any, of chain termination agent present. For the most part, only one or two further additions of alkali metal salt are necessary to reach the desired molecular weight. Moreover, the amount of PTC necessary to conduct the reaction is substantially decreased, typically to a level as low as 0.6 mole percent based on alkali metal salt. In some embodiments a first further addition of alkali metal salt is done when the polymer solids level of the reaction mixture is in one embodiment in a range of between about 25% polymer solids level and about 60% polymer solids level; in another embodiment in a range of between about 25% polymer solids level and about 50% polymer solids level; in another embodiment in a range of between about 25% polymer solids level and about 40% polymer solids level, and in still another embodiment in a range of between about 30% polymer solids level and about 40% polymer solids level.

Embodiment E is based on the discovery of unexpected advantages resulting from the use of alkali metal salt of small particle size. Said salt exists in the reaction mixture in the form of a slurry in solvent, and undergoes a pseudo-interfacial reaction, mediated by the PTC, with the bischlorophthalimide which is in solution (being sparingly soluble). Therefore, the surface area of the alkali metal salt is a factor in reaction rate.

In some preparative embodiments the alkali metal salt has an average particle size below about 100 microns, as determined by laser diffraction using, for example, a Lasentec Size Analyzer. However, individual particles may be, without further treatment, as large as 500-1,000 microns. It has been discovered that such particles of large size can persist for many hours during the polymerization reaction, resisting dissolution and increasing the time necessary to reach a desired polymer molecular weight, among other detrimental factors.

In embodiment E, the presence of particles of a diameter greater than about 200 microns is avoided, causing a substantial increase in molecular weight over time. The percentage of particles with diameter greater than about 200 microns is in one embodiment less than about 30%, in another embodiment less than about 25%, and in still another embodiment less than about 20% of the total particles. In other embodiments the percentage of particles with diameter greater than about 500 microns is in one embodiment less than about 5%, in another embodiment less than about 2%, and in still another embodiment less than about 1% of the total particles. In a particular embodiment the percentage of particles with diameter greater than about 200 microns is less than about 25%, and the percentage of particles with diameter greater than about 500 microns is less than about 1%. In one embodiment the desired particle size range may be achieved by using commercially available grinders or their art-recognized equivalents, either during or after preparation of the alkali metal salt, to reduce particle size in the salt as required.

In another embodiment control of particle size may be achieved during preparation or dehydration of the alkali metal salt. In a particular embodiment the alkali metal salt of a dihydroxy-substituted aromatic hydrocarbon may be prepared by contacting in water at least one dihydroxy-substituted aromatic hydrocarbon and at least one alkali metal base, such as an alkali metal hydroxide. In one embodiment the alkali metal hydroxide is sodium hydroxide. Contact is performed using amounts of dihydroxy-substituted aromatic hydrocarbon and alkali metal base which are in one embodiment stoichiometric, in another embodiment deviate from stoichiometry by no more than plus/minus 0.1 mole %, in another embodiment deviate from stoichiometry by no more than plus/minus 0.2 mole %, in another embodiment deviate from stoichiometry by no more than plus/minus 0.3 mole %, and in still another embodiment deviate from stoichiometry by no more than plus/minus 0.4 mole %. Said contact may be performed in water at a temperature in one embodiment above about 60° C., in another embodiment above about 70° C., in another embodiment above about 80° C., and in still another embodiment above about 90° C. In a particular embodiment said contact is performed at a temperature in a range of between about 90° C. and about 100° C. Said contact may be performed under an inert atmosphere, such as under nitrogen. Said contact may be performed at a solids level in one embodiment of greater than about 15%, in another embodiment of greater than about 20%, and in still another embodiment of greater than about 25%, wherein solids level is weight reactants divided by the sum of weight reactants and weight solvent. In one particular embodiment said contact is performed at a solids level in a range of between about 26% and about 31%, and in another particular embodiment at a solids level in a range of between about 27% and about 30%. The course of the reaction may be monitored by known methods. The alkali metal salt reaction product may be isolated by known methods. In a particular embodiment the salt reaction product may be isolated by spraying of the aqueous solution containing the product into an organic solvent with boiling point above that of water. In some embodiments said solution is sprayed at a solids level similar to the solids level at which the salt was prepared. In other embodiments said solution is diluted with additional solvent before spraying. Spraying of the aqueous solution (sometimes referred to as atomization of the aqueous solution) into an organic solvent prevents agglomeration of salt during removal of water. In some embodiments the organic solvent is toluene, xylene, ortho-dichlorobenzene, para-dichlorobenzene, dichlorotoluene, 1,2,4-trichlorobenzene, diphenyl sulfone, phenetole, anisole or veratrole, or mixtures thereof. In some embodiments said organic solvent forms an azeotrope with water. In one particular embodiment the organic solvent is ortho-dichlorobenzene. In another particular embodiment the organic solvent is toluene. In one embodiment the organic solvent is contained in a vessel (sometimes referred to hereinafter as a dryer) which in various embodiments comprises baffles beneath the surface of said solvent which are believed to help prevent fouling of the vessel with salt cake. In various embodiments said vessel contains means for agitation. In one particular embodiment said vessel comprises a stirred tank with at least one stirring shaft agitator. The degree of agitation is typically such as not to favor formation of salt cake which may be difficult to remove from the dryer. Said vessel containing organic solvent may be fitted with one or more spray nozzles for introduction of aqueous solution containing salt. Any dead space cavities in the dryer may be heated externally or flushed with dry solvent to prevent any accumulation of water therein. In one embodiment the vessel sides and top are traced with heating element. The rate of introduction of salt-containing aqueous solution into the vessel containing organic solvent depends upon a number of factors including, but not limited to, vessel size, and may be determined without undue experimentation by those skilled in the art. In some embodiments, if the rate of introduction is too high, then the temperature of the organic solvent may fall and alkali metal salt may tend to cake. On the other hand, if the rate of introduction is too low, then process economics are less favorable. In particular embodiments salt-containing aqueous solution is introduced into the vessel in such a manner that said solution does not impact the walls of the vessel or any stirrer shaft. The temperature of the organic solvent into which the aqueous solution is sprayed is in one embodiment in a range of between about 100° C. and about 220° C., in another embodiment in a range of between about 110° C. and about 200° C., in another embodiment in a range of between about 130° C. and about 180° C., and in still another embodiment in a range of between about 140° C. and about 160° C. In some embodiments heat is provided to the organic solvent by circulating said solvent through a heat exchanger. In one particular embodiment the heat exchanger is a tube-shell heat exchanger. In another particular embodiment the heat exchanger is a spiral heat exchanger. When said solvent contains alkali metal salt, the rate of flow of the solvent-salt mixture through the heat exchanger is such that turbulent flow is achieved to prevent fouling of the exchanger by solid salt, and may be determined by those skilled in the art without undue experimentation. In one embodiment the vessel holding organic solvent into which the aqueous solution is introduced may be under positive pressure so that the temperature of organic solvent may be above its normal boiling point at atmospheric pressure. Said vessel may be at a pressure in one particular embodiment in a range of between about and about 30 kilopascals (kPa) and about 280 kPa, in another particular embodiment in a range of between about 65 kPa and about 240 kPa, and in another particular embodiment in a range of between about 100 kPa and about 210 kPa. In another embodiment the vessel holding organic solvent into which the aqueous solution is introduced may be under reduced pressure. Any organic solvent exiting the vessel along with vaporized water may optionally be replaced by adding additional organic solvent. In one embodiment additional organic solvent is added simultaneously with water vaporization to keep the total volume of solvent substantially the same. As water and organic solvent are removed from the vessel some precipitated alkali metal salt may be entrained. In various embodiments the entrained salt is recovered using any known means. In a particular embodiment entrained salt may be knocked out of water-solvent mixture by a spray of organic solvent introduced into a vent through which the water-solvent mixture with entrained salt passes. Said salt in organic solvent may then be passed back to the dryer. The salt reaction product may be isolated at a solids level in organic solvent of in one embodiment between about 5% and about 30%, and in another embodiment between about 10% and about 20%. Before or during transfer to a polymerization vessel the salt reaction product in organic solvent may be subjected to at least one drying step which may include, but is not limited to, combination with additional organic solvent and distillation, optionally at reduced pressure, or distillation of organic solvent from the mixture with addition of dry organic solvent at approximately the same rate as to keep the solvent amount in the dryer roughly constant. Dry organic solvent in the context of the present process means solvent with less than 100 ppm water. In other embodiments the salt in organic solvent may be transferred from the dryer to at least one other vessel for drying. The amount of water in the salt-containing organic solvent may be determined using known methods. In some embodiments the amount of water in the salt-containing organic solvent may be determined indirectly by measuring water content of an over-head distillate. The amount of water in the salt-containing organic solvent before use in the polymerization reaction is in one embodiment less than about 40 ppm, in another embodiment less than about 30 ppm, and in still another embodiment less than about 20 ppm. Before or during transfer to a polymerization vessel the salt reaction product in organic solvent may be subjected to at least one particle size reduction step using equipment which may include, but is not limited to, one or more centrifugal pumps, grinders, drop-down blenders, particle size reduction homogenizer or delumpers. Embodiments of the process for making alkali metal salt described herein may be performed in batch, continuous or semi-continuous mode, and are capable of making alkali metal salts of not only dihydroxy-substituted aromatic hydrocarbons but also monohydroxy-substituted aromatic hydrocarbons, trihydroxy-substituted aromatic hydrocarbons and tetrahydroxy-substituted aromatic hydrocarbons.

In embodiment F, careful control of the purity of one or both reagents is exercised, thus maximizing reaction rate and improving efficiency in attaining the desired molecular weight. Regarding the alkali metal salt (embodiment F-1), it has been found that the presence of free dihydroxy-substituted aromatic hydrocarbon decreases the molecular weight of the polyetherimide product. The amount of free dihydroxy-substituted aromatic hydrocarbon is in one embodiment at most about 0.3 mole %, in another embodiment at most about 0.2 mole %, and in yet another embodiment at most about 0.15 mole % of the alkali metal salt. Also, the presence of free alkali metal hydroxide may cause a substantial decrease in molecular weight over time. The amount of free alkali metal hydroxide is in one embodiment at most about 0.3 mole %, in another embodiment at most about 0.2 mole %, and in yet another embodiment at most about 0.15 mole % of the alkali metal salt. Therefore, this embodiment includes the employment of alkali metal salt in which said materials are present in lesser proportions, and in a particular embodiment the employment of stoichiometrically pure salt; that is, salt that is typically prepared from a stoichiometrically equivalent amount of dihydroxy-substituted aromatic hydrocarbon and alkali metal hydroxide.

Regarding the bischlorophthalimide prepared by reaction of a diamine with two equivalents of an anhydride (embodiment F-2), a reagent containing residual amine often results in molecular weight below the desired value, as does the presence of such common impurities as phthalide, chlorophthalides and chlorobenzoic acids. Thus, bischlorophthalimide which is stoichiometrically pure (i.e., is within 0.02 mole % of stoichiometric) or has up to 0.5 mole % of residual anhydride groups requires a minimum of time to afford product of a specific desired molecular weight. The same is true of bischlorophthalimide containing in one embodiment at most about 1000 ppm of phthalides and in another embodiment at most about 500 ppm phthalides, including chlorophthalides, and at most about 0.15 mole % of chlorobenzoic acids.

Regulation of the amine to anhydride stoichiometry of the reactants producing the bischlorophthalimide (e.g., m-phenylenediamine and 4-chlorophthalic anhydride) may be accomplished by known methods. Bischlorophthalimide purity will depend to some extent on method of preparation. When necessary, phthalides may be removed from the bischlorophthalimide by extraction of an aqueous solution of the corresponding chlorophthalic acid with an organic solvent including, but not limited to, toluene or xylene, while chlorobenzoic acids may be removed by extraction of an organic solvent solution of the chlorophthalic anhydride with aqueous bicarbonate, typically sodium bicarbonate.

Other than as prescribed hereinabove for specific embodiments, the alkali metal salt and chlorophthalimide are typically employed over the cumulative course of the reaction in substantially equimolar amounts. For maximum molecular weight, the amounts should be as close as possible to exactly equimolar, but molecular weight control may be achieved by employing one reagent or the other in slight excess. It is also within the scope of the invention to employ chain termination agents, as noted hereinabove.

Reaction temperatures in embodiments of the invention are most often in the range of between about 125° C. and about 250° C. in some embodiments, and in the range of between about 180° C. and about 225° C. in other embodiments. The proportion of phase transfer catalyst employed is generally about 0.5-10 mole percent based on alkali metal salt, with lesser amounts within this range generally being necessary.

Following the desired level of completion of the reaction, the aromatic polyether polymer may be isolated by conventional methods. This may include, but is not limited to, steps of washing and precipitation by combination of the polymer solution with a non-solvent for the polymer.

Without further elaboration, it is believed that one skilled in the art can, using the description herein, utilize the present invention to its fullest extent. The following examples are included to provide additional guidance to those skilled in the art in practicing the claimed invention. The examples provided are merely representative of the work that contributes to the teaching of the present application. Accordingly, these examples are not intended to limit the invention, as defined in the appended claims, in any manner. Unless otherwise specified, all parts and percentages are by weight. Reagent grade o-dichlorobenzene (ODCB, employed as solvent) was dried over 4 angstrom molecular sieves; hexaethylguanidinium chloride (HEGCl) was used as a 20% solution in ODCB; 1,3-bis(N-(4-chlorophthalimido))benzene (Formula XVII; sometimes referred to as "ClPAMI") (or the 3-chloro isomer when specified) was ground in a Waring blender and dried in vacuum at 160° C. for 24 hours; bisphenol A disodium salt (BPA-Na) was filtered from a toluene slurry, dried in vacuum at 160° C. for 24 hours, ground in a Waring blender and dried for an additional 24 hours; and all reagents were stored and handled in a nitrogen-filled dry box. Weight average molecular weights (Mw) and levels of cyclic oligomers were determined by gel permeation chromatography relative to polystyrene standards. PTC levels are based on BPA-Na, and CTA (when employed) concentrations are based on ClPAMI.

(XVII)

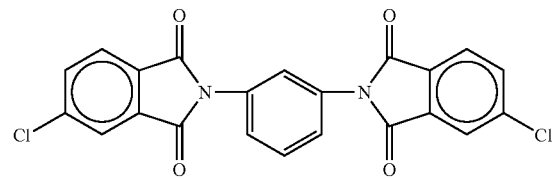

Example 1

Embodiment A

A slurry of ClPAMI in ODCB was prepared by the reaction of m-phenylenediamine with 4-chlorophthalic anhydride in a 250 ml three-necked flask and stored until use under nitrogen, along with a measured amount of 1-(N-(4-chlorophthalimido))-3-(N-phthalimido)benzene as CTA. The flask was fitted with a nitrogen sparge tube atop a reflux condenser, a mechanical stirrer and a distillation apparatus. A further portion of ODCB was added, and distillation was performed under nitrogen to dry the slurry to a water content of at most about 10 ppm. BPA-Na slurry in ODCB was dried similarly in a separate flask.

When both slurries were dry, the BPA-Na slurry was added to the ClPAMI slurry by pouring quickly under nitrogen and rinsing with dry ODCB, in a molar ratio of aryl chloride groups to ONa groups of 1.01:1 and a polymer solids level of 25%. A final distillation was performed to reduce the water content to at most 10 ppm.

HEGCl, 0.8 mole % (based on BPA-Na), was added to the dried mixture at 190° C., a timer was started and samples were removed periodically, quenched with acetic acid and analyzed for molecular weight. The initial reaction rate was calculated as the slope of the molecular weight-time curve from 0 to 30 minutes.

Example 2

Embodiment A

Predried and isolated reagents ClPAMI, CTA, BPA-Na and dry ODCB (5 ppm water content) were added together to a 250 ml three-necked flask and heated to reflux. HEGCl, 0.8 mole % (based on BPA-Na), was added to the mixture at 190° C., a timer was started and samples were removed periodically, quenched with acetic acid and analyzed for molecular weight. The initial reaction rate (in units of kilograms/mole minute) was calculated as the slope of the molecular weight-time curve from 0 to 30 minutes.

Example 3

Embodiment A

The procedure of Example 1 was followed except that the reaction was spiked at 180° C. with wet ODCB to a total water content of 45 ppm before catalyst addition. The amount of additional ODCB added was such that the % solids level remained at about 25%.

Example 4

Embodiment A

The procedure of Example 1 was followed except that the reaction was cooled to room temperature before spiking with wet ODCB to a total water content of 45 ppm before catalyst addition. The amount of additional ODCB added was such that the % solids level remained at about 25%.

Example 5

Embodiment A

The procedure of Example 2 was followed except that the ODCB had an initial water content of 57 ppm and was azeotropically dried to a total water content of 5 ppm before catalyst addition.

Example 6

Embodiment A

The procedure of Example 2 was followed except that the ODCB had an initial water content of 57 ppm and was azeotropically dried to a total water content of 5 ppm after catalyst addition.

The results of Examples 1-6 are listed in Table I, in comparison with a control reaction which employed the procedure of Example 2, except that the ODCB had an initial water content of 57 ppm and was not subsequently dried.

TABLE I

| Example | Initial solvent water content, ppm | Initial rate | Mw, 1 hr. | Mw, 3 hrs. |
|---|---|---|---|---|
| 1 | 5 | 0.997 | 39,200 | 40,900 |
| 2 | 5 | 0.388 | 25,900 | 39,500 |
| 3 | 5, spiked to 45 at 180° C. before catalyst addition | 0.824 | 33,700 | 41,700 |
| 4 | 5, spiked to 45 at room temp. before catalyst addition | 0.396 | 25,500 | 31,200 |
| 5 | 57, dried in situ to 5 before catalyst addition | 0.676 | 37,800 | 42,700 |
| 6 | 57, dried in situ to 5 after catalyst addition | 0.359 | 22,100 | 42,700 |
| Control | 57 | 0.153 | 9,400 | 22,800 |

From a comparison of Example 1 with Example 2, the advantage of the particular subset of embodiment A will be apparent. Example 1 when compared with Comparison of Example 3 with Example 4 shows the unexpected advantage for reaction rate and polymer molecular weight of having the reactants spend as little time as possible in the presence of water. Examples 5 and 6, when compared with the Control, show the advantage of drying, particularly before addition of the catalyst. Comparison of Example 5 with Example 6 shows the unexpected advantage for reaction rate and polymer molecular weight of having the reactants and catalyst spend as little time as possible in the presence of water.

Examples 7-10

Embodiment C

The procedure of Example 1 was repeated at a total water content of less than 10 ppm, using various proportions of PTC and 4-chloro-N-phenylphthalimide as CTA, varying the solids level and employing, in certain examples, a mixture of 3- and 4-isomers of ClPAMI. Proportions of cyclic oligomers having degrees of polymerization up to 4 were determined. Comparison was made with two controls:

Control A, at 15% polymer solids level;
Control B, a commercially available polyetherimide prepared by the reaction of m-phenylenediamine with 2,2-bis(4-(dicarboxyphenoxy)phenyl)propane dianhydride (96:4 ratio of 3,4-dicarboxy to 2,3-dicarboxy isomer).

Example 11

Embodiment C

The procedure of Example 1 was repeated, replacing the ClPAMI with an analogous compound prepared by the reaction of 4- and 3-chlorophthalic anhydrides (70:30 weight ratio) with 4,4'-diaminodiphenyl ether.

The results of Examples 7-11 are listed in Table II. Mole percentages of PTC are based on BPA-Na; mole percentages of CTA on ClPAMI.

TABLE II

| Example | Solids level, % | PTC, mole percent | CTA, mole percent | Molar ratio, 4- to 3-isomer | Total cyclics, wt. % |
|---|---|---|---|---|---|
| 7 | 25 | 1.0 | 3.8 | 70:30 | 2.06 |
| 8 | 30 | 0.8 | 3.8 | 96:4 | 1.69 |
| 9 | 30 | 0.8 | 3.8 | 0:100 | 3.97 |
| 10 | 30 | 0.8 | 3.5 | 70:30 | 1.89 |
| 11 | 30 | 0.8 | 7.0 | 30:70 | 1.12 |
| Control A | 15 | 1.0 | 4.0 | 75:25 | 4.9 |
| Control B | — | — | — | 96:4 | 1.13 |

The results in Table II show the unexpected advantage at operating at a relatively high solids level, which affords a product approaching, in low cyclics content, the commercially available one prepared from a dianhydride and diamine. They further show the particular advantage of a solids level of at least 30%. The relatively high cyclics level in Example 5 is believed to be a steric effect of employing 100% 3-isomer, which is more readily cyclized than the 4-isomer.

Examples 12-15

Embodiment C

The procedure of Example 1 was employed with the following solids and PTC levels:
Example 12: 15%, 1.8 mole percent;
Example 13: 22%, 1.8 mole percent;
Example 14: 22%, 1.3 mole percent;
Example 15: 22%, 1.0 mole percent.

The results are shown graphically in FIG. 1. It is apparent that molecular weight attained over time is substantially higher at 22% than at 15% solids level, at least after reaction times of about 45 minutes, even with the use of lower PTC concentrations.

Example 16

Embodiment D

The procedure of Example 1 was repeated at a solids level of 30%, a PTC proportion of 0.8 mole percent PTC and 3.0-4.7 mole % (based on ClPAMI) of 4-chloro-N-phenylphthalimide as CTA, except that in an initial stage of the reaction, a molar ratio of ClPAMI to BPA-Na of 1.03:1 was employed. When a Mw in the range of between about 25,000 and about 37,000 (depending on CTA level) had been reached, further BPA-Na was added in an amount determined from number average molecular weight and the reaction was continued. As necessary, a further addition of BPA-Na was made, to a total molar ratio of ClPAMI to BPA-Na of 1.01:1. It was found that said constant molar ratio was possible, in contrast to previous experiments employing a greater excess of ClPAMI in the initial stage when the molar ratio had to be varied from 0.99:1 to 1.05:1. In addition, the level of unreactive N-phenylphthalimide end groups was almost twice that determined in previous experiments, and total reaction time was as low as 1.5 hours on a laboratory scale or 3 hours on a large scale, as contrasted with 8-10 hours in previous work.

Examples 17-18

Embodiment E

Figure 2:
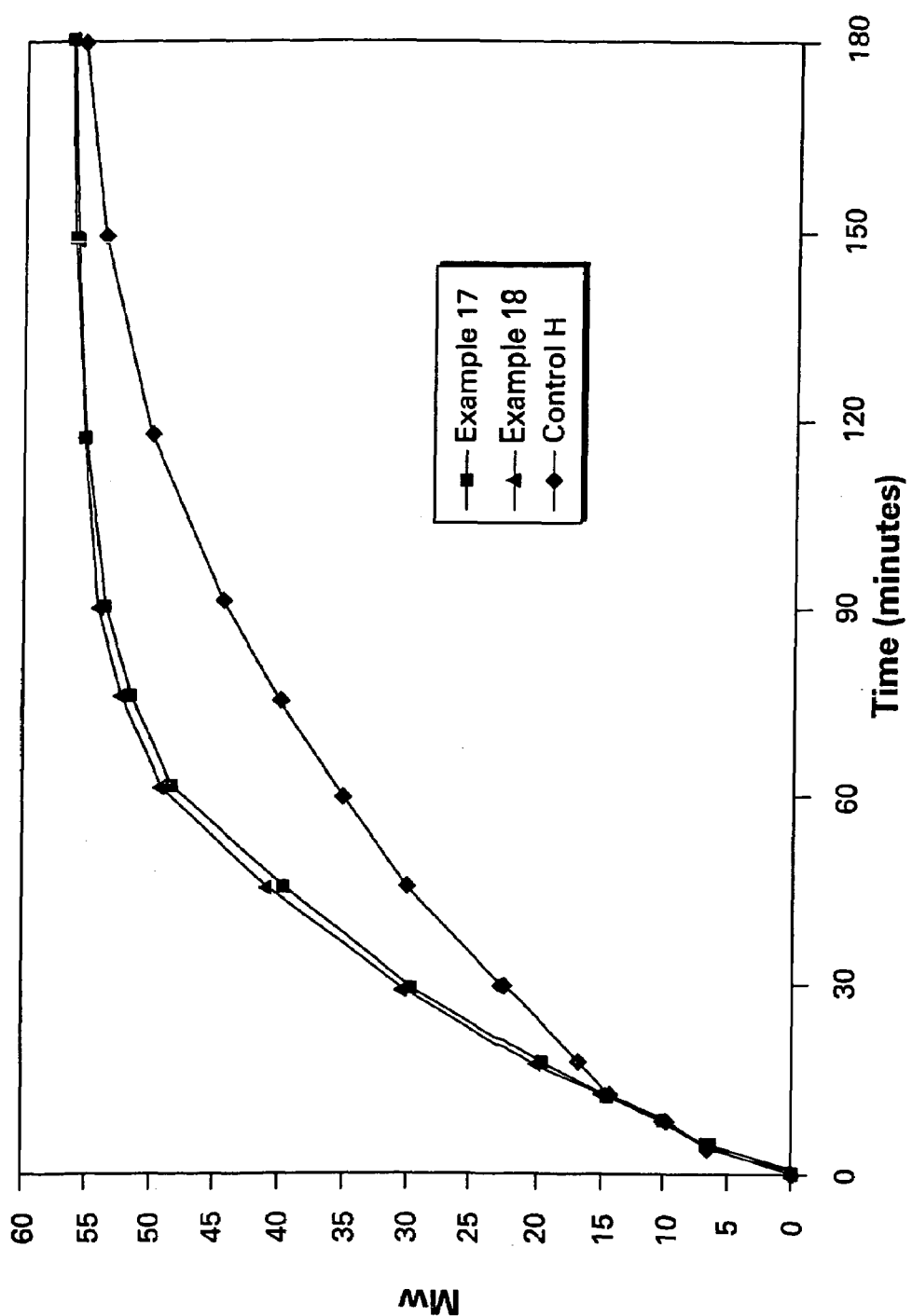
Figure 7:
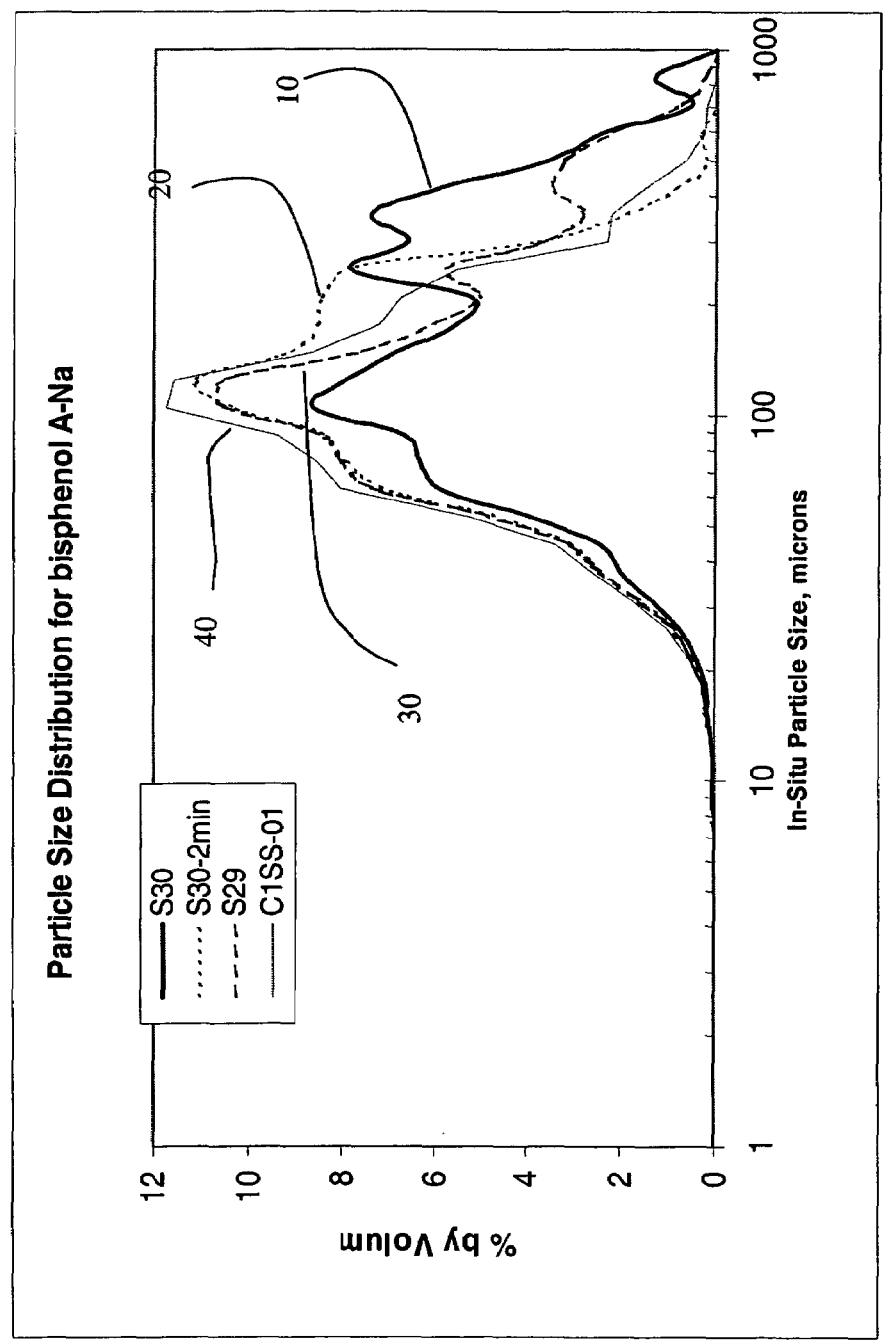
FIG. 7 illustrates the effect of grinding on the particle size distribution in a slurry of an alkali metal salt of a dihydroxy-substituted aromatic hydrocarbon in an organic solvent.

The procedure of Example 1 was repeated at a water content of less than 10 ppm, a solids level of 25%, a CTA level of 3.6 mole percent and a PTC level of 0.7 mole percent. The BPA-Na employed was ground by immersing a laboratory-scale tissue homogenizer in the slurry thereof for 5 minutes (Example 17) or 10 minutes (Example 18), reducing the maximum particle diameter in each example to about 200 microns. The results are shown graphically in FIG. 2, in comparison with Control H employing unground BPA-Na. The unexpected advantage of using small particle size BPA-Na is evident. The data show that grinding of the BPA-Na results in enhancement of the polymerization rate (Compare the rate curves of Examples 17 and 18 with the Control H curve). The rate of polymerization exhibited using the ground BPA-Na (Examples 17 and 18) is consistently higher than that observed for unground BPA-Na (Control H). Data on grinding and particle size distribution is presented in FIG. 7. Curve 10 (FIG. 7) shows the particle size distribution for an unground sample of a slurry of BPA-Na. Curve 20 (FIG. 7) shows the particle size distribution of a representative sample of a slurry of BPA-Na after grinding for two minutes. Curve 30 (FIG. 7) shows the particle size distribution of a representative sample of a slurry of BPA-Na after grinding for two minutes under slightly different conditions from those used in the generation of curve 20. Curve 40 (FIG. 7) shows the particle size distribution of a representative sample of a slurry of BPA-Na after grinding for ten minutes. The data show clearly that grinding of the slurry results in a reduction of particle size of the BPA-Na.

Examples 19-22

Embodiment F-1

The procedure of Example 1 was repeated with a PTC level of 0.8 mole percent, a solids level of 25%, a CTA level of 3.6 mole percent and a water content of at most 10 ppm, using BPA-Na which had been prepared in toluene, filtered and dried in vacuum. Four different grades of BPA-Na were employed: stoichiometrically pure to within 0.05% (Example 19), varying from stoichiometric purity by at most 0.15% (Example 20), BPA-rich by 0.3% (Example 21) and sodium hydroxide-rich by 0.3% (Example 22).

Figure 3:
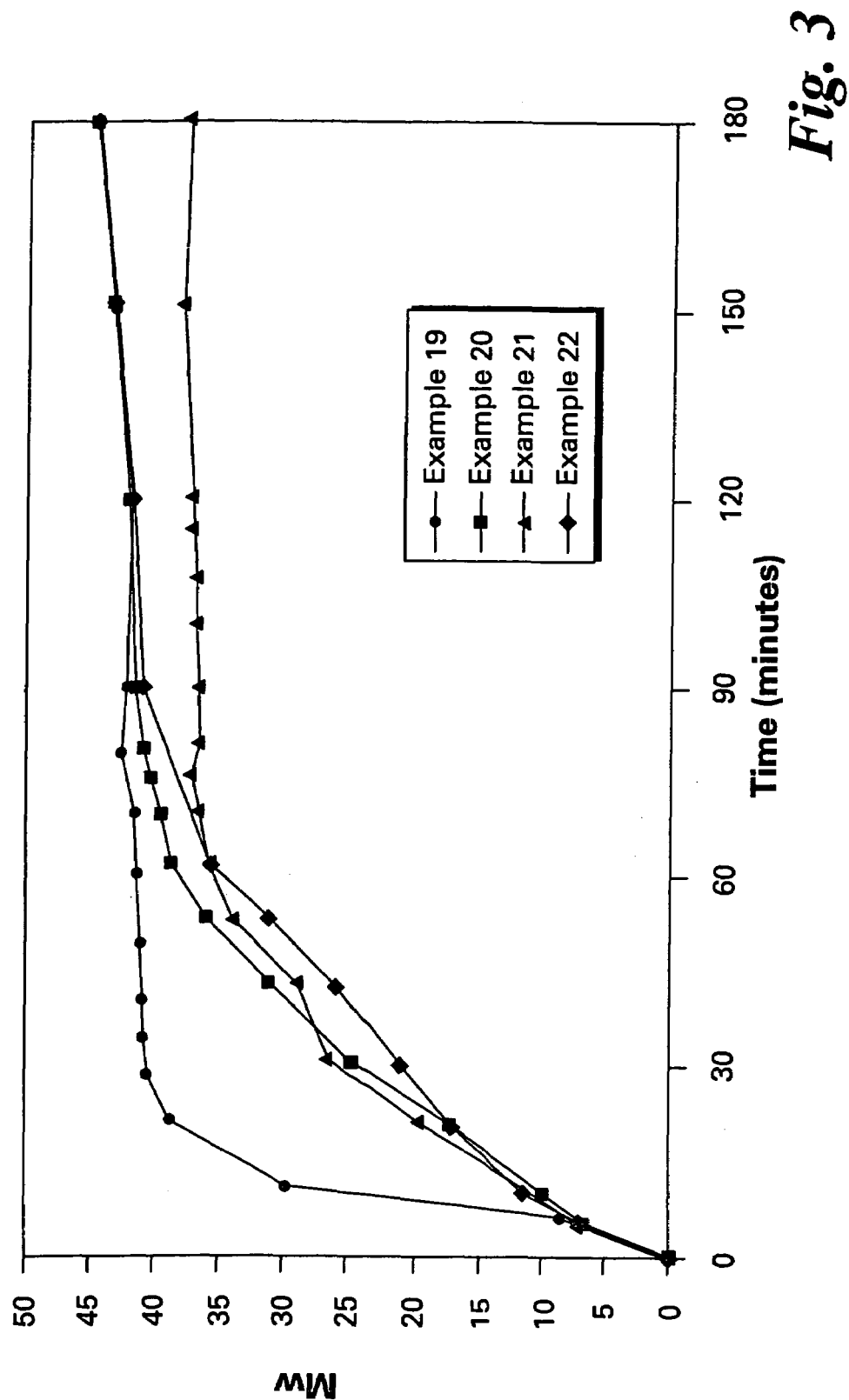

The results are shown graphically in FIG. 3, which shows a significant decrease in molecular weight over time with the use of BPA-Na having any proportion of impurities. The most significant decreases, at least over times up to about 75 minutes, occur with the use of salt containing greater than 0.15% impurities.

Example 23

Embodiment F-2

Figure 4:
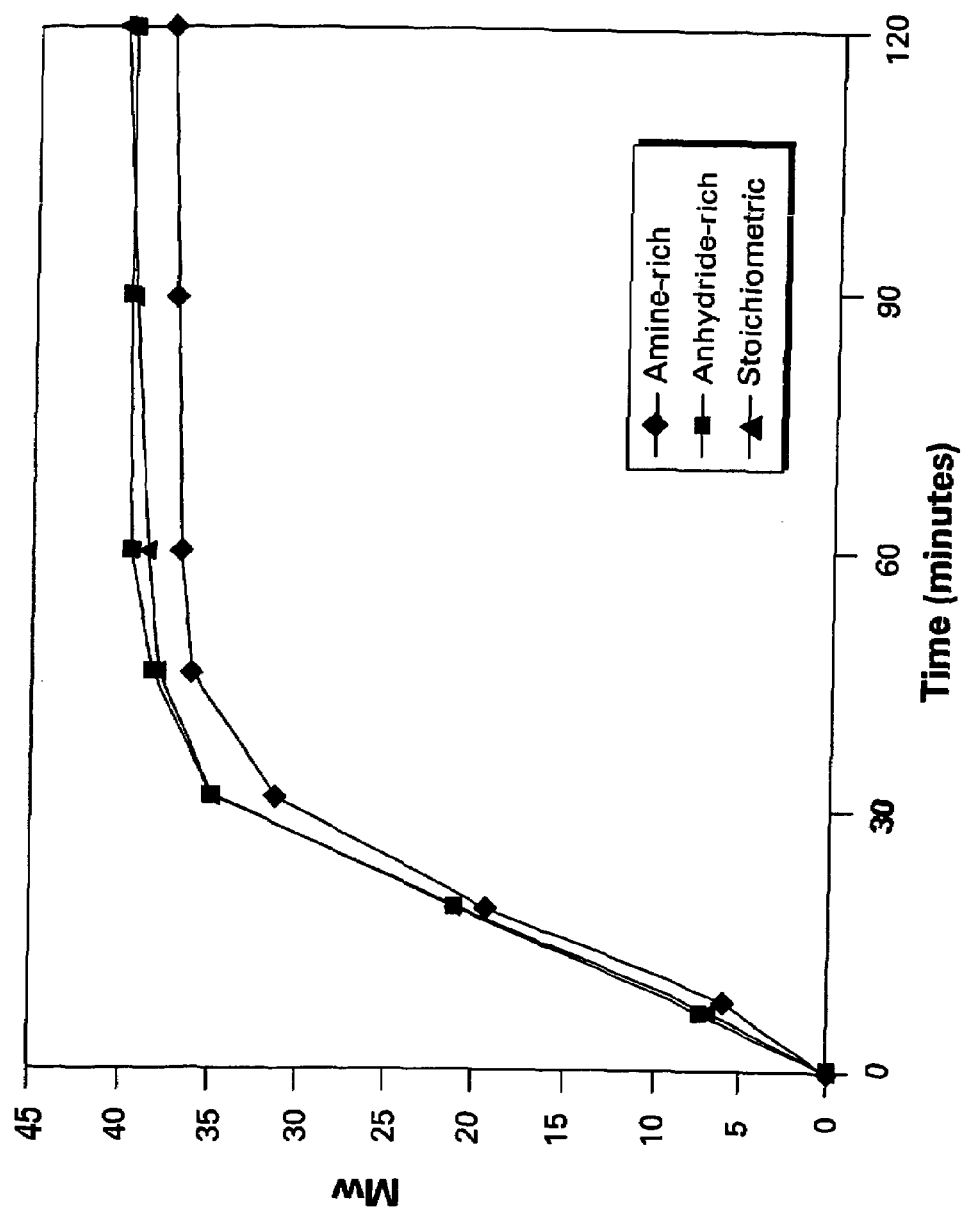

The procedure of Example 1 was repeated with a PTC level of 0.8 mole percent, a solids level of 25%, a CTA level of 3.7 mole percent and a water content of at most 10 ppm, using ClPAMI of various purities: within 0.02% of stoichiometric, 0.5% rich in amine, and 0.5% rich in anhydride. The results are shown graphically in FIG. 4, and show the advantage of employing stoichiometrically pure or anhydride-rich ClPAMI.

Example 24

Embodiment F-2

Figure 5:
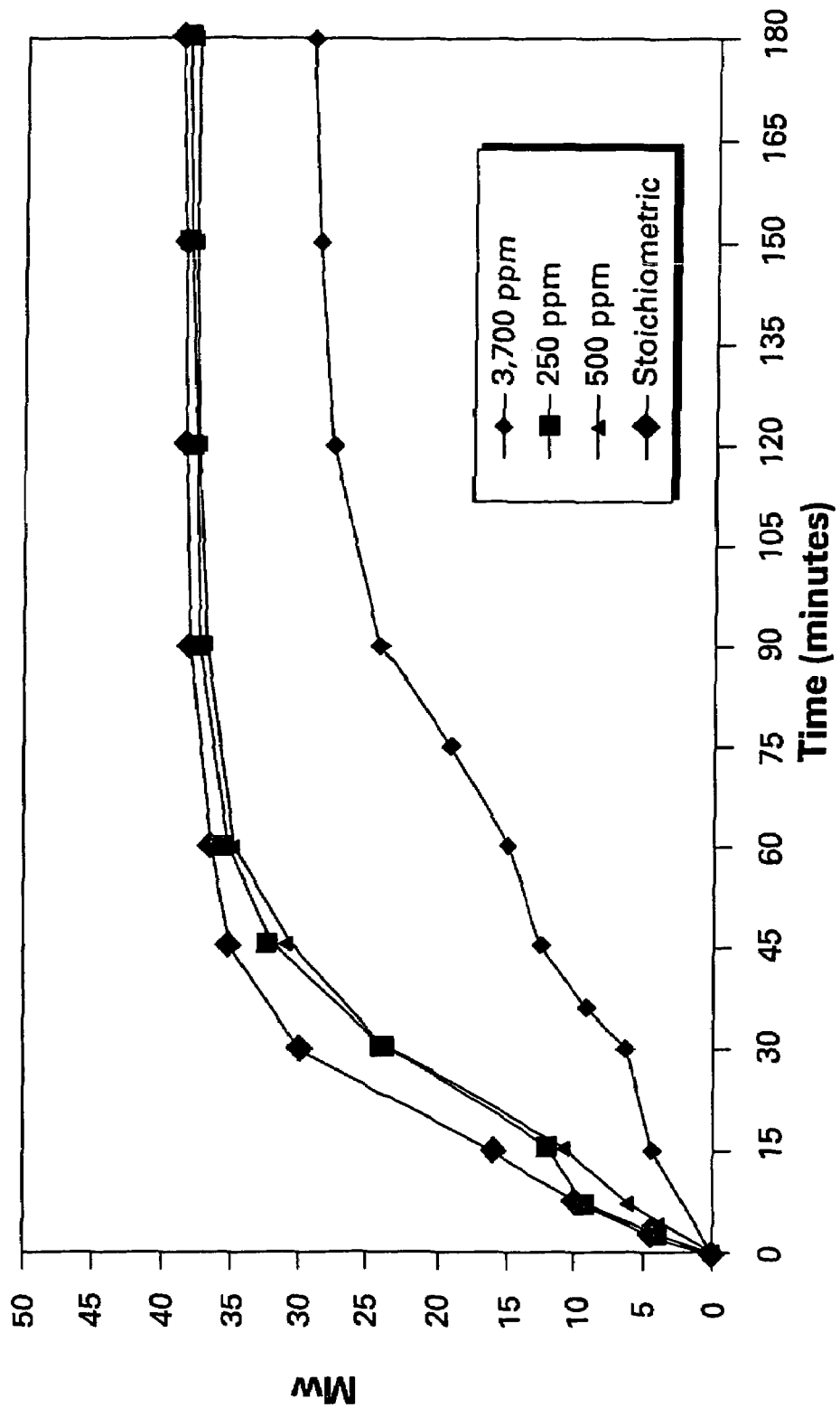

The procedure of Example 1 was repeated with a PTC level of 0.8 mole percent, a solids level of 25%, a CTA level of 3.7 mole percent and a water content of at most 10 ppm, using stoichiometrically pure ClPAMI and three samples which had been spiked with 250, 500 and 3,700 ppm of phthalide. The results are shown graphically in FIG. 5, which shows that phthalide levels up to 500 ppm produce essentially identical results but higher levels cause a substantial decrease in molecular weight over time.

Example 25

Embodiment F-2

Figure 6:
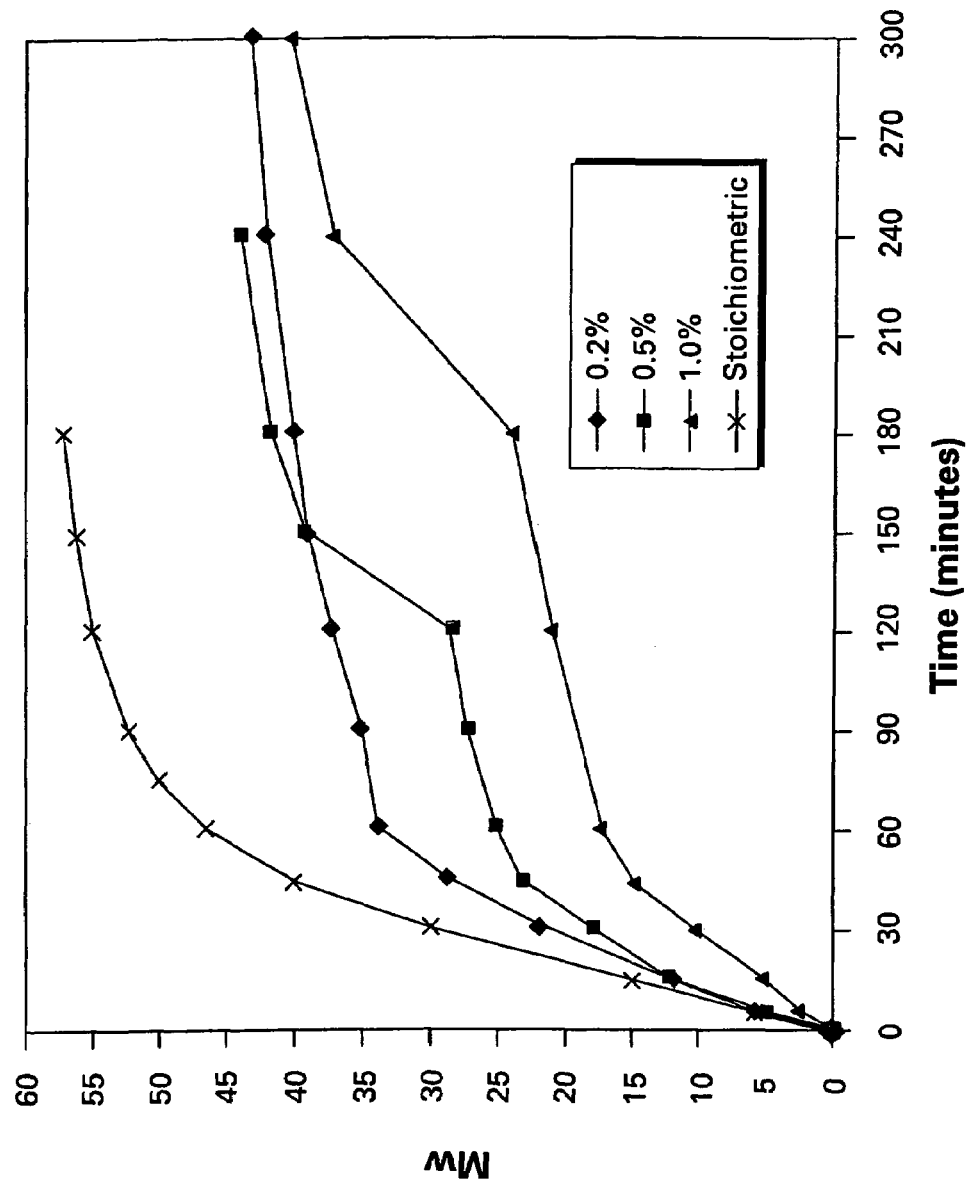

The procedure of Example 1 was repeated with a PTC level of 0.8 mole percent, a solids level of 25%, a CTA level of 3.5 mole percent and a water content of at most 10 ppm, using stoichiometrically pure ClPAMI and three samples which had been spiked with 0.2 mole %, 0.5 mole % and 1.0 mole % of chlorobenzoic acids. The results are shown graphically in FIG. 6, which shows that chlorobenzoic acid levels as low as 0.2 mole % cause a substantial decrease in molecular weight over time.

While typical embodiments have been set forth for the purpose of illustration, the foregoing descriptions and examples should not be deemed to be a limitation on the scope of the invention. Accordingly, various modifications, adaptations, and alternatives may occur to one skilled in the art without departing from the spirit and scope of the present invention. It is also anticipated that advances in science and technology will make equivalents and substitutions possible that are not now contemplated by reason of the imprecision of language and these variations should also be construed where possible to be covered by the appended claims. All patents cited herein are incorporated herein by reference.

The invention claimed is:

1. A method for preparing an aromatic polyether polymer which comprises contacting, in a solvent of low polarity, substantially equimolar amounts of at least one alkali metal salt of a dihydroxy-substituted aromatic hydrocarbon and at least one bis((N-(chlorophthalimido))aromatic compound, in the presence of a phase transfer catalyst which is substantially stable at the temperatures employed;
wherein said at least one alkali metal salt of a dihydroxy-substituted aromatic hydrocarbon has less than about 25% of particles with a diameter of greater than about 200 microns.

2. The method according to claim 1 wherein the solvent is at least one member selected from the group consisting of o-dichlorobenzene, dichlorotoluene, 1,2,4-trichlorobenzene, diphenyl sulfone, phenetole, anisole and veratrole.

3. The method according to claim 2 wherein the solvent is ortho-dichlorobenzene.

4. The method according to claim 1 wherein the alkali metal salt is derived from at least one dihydroxy-substituted aromatic hydrocarbon of the formula

wherein D has the structure of formula:

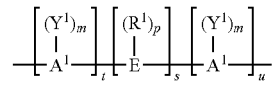

wherein $A^1$ represents an aromatic group;

E comprises a sulfur-containing linkage, sulfide, sulfoxide, sulfone; a phosphorus-containing linkage, phosphinyl, phosphonyl; an ether linkage; a carbonyl group; a tertiary nitrogen group; a silicon-containing linkage; silane; siloxy; a cycloaliphatic group; cyclopentylidene, cyclohexylidene, 3,3,5-trimethylcyclohexylidene, methylcyclohexylidene, 2-(2.2.1)-bicycloheptylidene, neopentylidene, cyclopentadecylidene, cyclododecylidene, adamantylidene; an alkylene or alkylidene group, which group may optionally be part of one or more fused rings attached to one or more aromatic groups bearing one hydroxy substituent; an unsaturated alkylidene group; or two or more alkylene or alkylidene groups connected by a moiety different from alkylene or alkylidene and selected from the group consisting of an aromatic linkage, a tertiary nitrogen linkage; an ether linkage; a carbonyl linkage; a silicon-containing linkage, silane, siloxy; a sulfur-containing linkage, sulfide, sulfoxide, sulfone; a phosphorus-containing linkage, phosphinyl, and phosphonyl;

$R^1$ comprises hydrogen; a monovalent hydrocarbon group, alkenyl, allyl, alkyl, aryl, aralkyl, alkaryl, or cycloalkyl;

$Y^1$ independently at each occurrence is selected from the group consisting of an inorganic atom, a halogen; an inorganic group, a nitro group; an organic group, a monovalent hydrocarbon group, alkenyl, allyl, alkyl, aryl, aralkyl, alkaryl, cycloalkyl, and an alkoxy group;

the letter "m" represents any integer from and including zero through the number of positions on $A^1$ available for substitution;

the letter "p" represents an integer from and including zero through the number of positions on E available for substitution;

the letter "t" represents an integer equal to at least one;

the letter "s" represents an integer equal to either zero or one; and

"u" represents any integer including zero.

5. The method according to claim 1 wherein the alkali metal salt is derived from at least one dihydroxy-substituted aromatic hydrocarbon selected from the group consisting of 4,4'-(3,3,5-trimethylcyclohexylidene)diphenol; 4,4'-bis(3,5-dimethyl)diphenol, 1,1-bis(4-hydroxy-3-methylphenyl)cyclohexane; 4,4-bis(4-hydroxyphenyl)heptane; 2,4'-dihydroxydiphenylmethane; bis(2-hydroxyphenyl)methane; bis (4-hydroxyphenyl)methane; bis(4-hydroxy-5-nitrophenyl) methane; bis(4-hydroxy-2,6-dimethyl-3-methoxyphenyl) methane; 1,1-bis(4-hydroxyphenyl)ethane; 1,2-bis(4-hydroxyphenyl)ethane; 1,1-bis(4-hydroxy-2-chlorophenyl) ethane; 2,2-bis(4-hydroxyphenyl)propane; 2,2-bis(3-phenyl-4-hydroxyphenyl)propane; 2,2-bis(4-hydroxy-3-methylphenyl)propane; 2,2-bis(4-hydroxy-3-ethylphenyl) propane; 2,2-bis(4-hydroxy-3-isopropylphenyl)propane; 2,2-bis(4-hydroxy-3,5-dimethylphenyl)propane; 3,5,3',5'-tetrachloro-4,4'-dihydroxyphenyl)propane; bis(4-hydroxyphenyl)cyclohexylmethane; 2,2-bis(4-hydroxyphenyl)-1-phenylpropane; 2,4'-dihydroxyphenyl sulfone; dihydroxy naphthalene, 2,6-dihydroxy naphthalene; hydroquinone; resorcinol; $C_{1-3}$ alkyl-substituted resorcinols; 2,2-bis-(4-hydroxyphenyl)butane; 2,2-bis-(4-hydroxyphenyl)-2-methylbutane; 1,1-bis-(4-hydroxyphenyl)cyclohexane; bis-(4-hydroxyphenyl); bis-(4-hydroxyphenyl)sulphide; 2-(3-methyl-4-hydroxyphenyl-2-(4-hydroxyphenyl)propane; 2-(3,5-dimethyl-4-hydroxyphenyl)-2-(4-hydroxyphenyl)propane; 2-(3-methyl-4-hydroxyphenyl)-2-(3,5-dimethyl-4-hydroxyphenyl)propane; bis-(3,5-dimethylphenyl-4-hydroxyphenyl)methane; 1,1-bis-(3,5-dimethylphenyl-4-hydroxyphenyl)ethane; 2,2-bis-(3,5-dimethylphenyl-4-hydroxyphenyl) propane; 2,4-bis-(3,5-dimethylphenyl-4-hydroxyphenyl)-2-methylbutane; 3,3-bis-(3,5-dimethylphenyl-4-hydroxyphenyl)pentane; 1,1-bis-(3,5-dimethylphenyl-4-hydroxyphenyl)cyclopentane; 1,1-bis-(3,5-dimethylphenyl-4-hydroxyphenyl)cyclohexane; bis-(3,5-dimethylphenyl-4-hydroxyphenyl)sulphide, 3-(4-hydroxyphenyl)-1,1,3-trimethylindan-5-ol, 1-(4-hydroxyphenyl)-1,3,3-trimethylindan-5-ol, 2,2,2',2'-tetrahydro-3,3,3',3'-tetramethyl-1,1'-spirobi(1H-indene)-6,6'-diol, and mixtures thereof.

6. The method according to claim 5 wherein the alkali metal salt is derived from bisphenol A.

7. The method according to claim 6 wherein the bisphenol A salt is the disodium salt.

8. The method according to claim 1 wherein the bis(N-(chlorophthalimido))aromatic compound has the formula

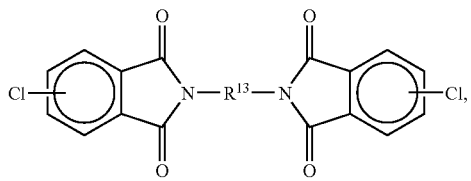

wherein $R^{13}$ comprises a $C_{6-22}$ divalent aromatic hydrocarbon or halogenated hydrocarbon radical, a $C_{2-22}$ alkylene or cycloalkylene radical or a divalent radical of the formula

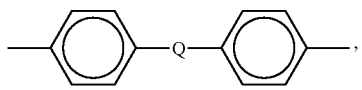

in which Q is a covalent bond or a member selected from the group consisting of

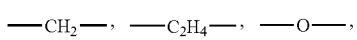

-continued

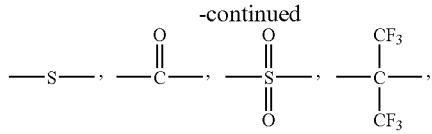

and an alkylene or alkylidene group of the formula $C_yH_{2y}$, wherein y is an integer from 1 to 5 inclusive.

9. The method according to claim 8 wherein $R^{13}$ is derived from at least one diamine selected from the group consisting of meta-phenylenediamine; para-phenylenediamine; 2-methyl-4,6-diethyl-1,3-phenylenediamine; 5-methyl-4,6-diethyl-1,3-phenylenediamine; bis(4-aminophenyl)-2,2-propane; bis(2-chloro-4-amino-3,5-diethylphenyl)methane, 4,4'-diaminodiphenyl, 3,4'-diaminodiphenyl, 4,4'-diaminodiphenyl ether, 3,4'-diaminodiphenyl ether, 4,4'-diaminodiphenyl sulfone, 3,4'-diaminodiphenyl sulfone, 4,4'-diaminodiphenyl ketone, 3,4'-diaminodiphenyl ketone, 2,4-toluenediamine; and mixtures thereof.

10. The method according to claim 1 wherein the phase transfer catalyst is a hexaalkylguanidinium salt.

11. The method according to claim 10 wherein the hexaalkylguanidinium salt is a chloride.

12. The method according to claim 1 wherein there is also present a chain termination agent.

13. The method according to claim 12 wherein the chain termination agent is at least one member selected from the group consisting of alkyl halides, alkyl chlorides, aryl halides, aryl chlorides, compounds of formula (XI) and compounds of formula (XII):

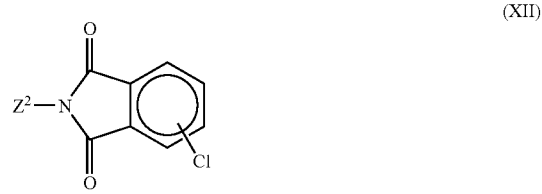

wherein the chlorine substituent is in the 3- or 4-position, and $Z^1$ and $Z^2$ comprise a substituted or unsubstituted alkyl or aryl group.

14. The method according to claim 12 wherein the chain termination agent comprises at least one of 4-chloro-N-methylphthalimide, 4-chloro-N-butylphthalimide, 4-chloro-N-octadecylphthalimide, 3-chloro-N-methylphthalimide, 3-chloro-N-butylphthalimide, 3-chloro-N-octadecylphthalimide, 4-chloro-N-phenylphthalimide, 3-chloro-N-phenylphthalimide, 1-N-(4-chlorophthalimido)-3-(N-phthalimido)benzene, 1-N-(3-chlorophthalimido)-3-(N-phthalimido)benzene, 4-N-(3-chlorophthalimido)phenyl-4'-(N-phthalimido)phenyl ether, 4-N-(4-chlorophthalimido) phenyl-4'-(N-phthalimido)phenyl ether, or the corresponding isomers derived from 3,4'-diaminodiphenyl ether, wherein any mono-substituted bis-phthalimide chain termination agent is optionally in admixture with bis-substituted bis-phthalimide monomer.

15. The method according to claim 1 wherein the alkali metal salt, in combination with a portion of solvent, is dried to a water content of at most about 20 ppm, and the bis(N-(chlorophthalimido))aromatic compound, in combination with a portion of solvent and, optionally with chain termination agent, is dried to a water content of at most about 20 ppm.

16. The method according to claim 15 wherein drying is by distillation.

17. The method according to claim 15 wherein the bis(N-(chlorophthalimido))aromatic compound, at least a portion of solvent and at least a portion of phase transfer catalyst, optionally predried separately, are combined and, optionally, further dried by distillation until the value of about 20 ppm water or less is attained; followed by addition of dry alkali metal salt to the mixture, wherein the initial solids level of the mixture is at least about 15% and the solids level following complete addition of salt and optional concentration is in a range of between about 15% and about 35%.

18. The method according to claim 1 wherein the alkali metal salt has less than about 5% of particles with a diameter of greater than about 500 microns.

19. The method according to claim 1 wherein the alkali metal salt has less than about 2% of particles with a diameter of greater than about 500 microns.

20. The method according to claim 1 wherein the alkali metal salt is subjected to at least one particle size reduction step using equipment which comprises one or more of a centrifugal pump, grinder, drop-down blender, particle size reduction homogenizer or delumper.

21. The method according to claim 20 wherein the particle size reduction step is performed on a slurry of alkali metal salt in an organic solvent before or during transfer of alkali metal salt to a polymerization vessel.

22. The method according to claim 21 wherein the slurry of alkali metal salt is prepared by spraying an aqueous solution of alkali metal salt into said organic solvent.

23. The method according to claim 22 wherein the alkali metal salt is the disodium salt of bisphenol A.

24. A method for preparing an aromatic polyether polymer which comprises contacting, in a solvent of low polarity, substantially equimolar amounts of at least one alkali metal salt of a dihydroxy-substituted aromatic hydrocarbon and at least one bis((N-(chlorophthalimido))aromatic compound in the presence of a phase transfer catalyst which is substantially stable at the temperatures employed;

wherein said at least one alkali metal salt of a dihydroxy-substituted aromatic hydrocarbon is the disodium salt of bisphenol A having less than about 25% of particles with a diameter of greater than about 200 microns;

wherein said at least one bis((N-(chlorophthalimido))aromatic compound is selected from the group consisting of 1,3- and 1,4-bis(N-(4-chlorophthalimido))benzene; 1,3- and 1,4-bis(N-(3-chlorophthalimido))benzene; 1,3- and 1,4-(N-(3-chlorophthalimido))-(N-(4-chlorophthalimido))benzene; 3,3'-, 3,4'- and 4,4'-bis(N-(3-chlorophthalimido))phenyl ether; 3,3'-, 3,4'- and 4,4'-bis(N-(4-chlorophthalimido))phenyl ether; and 3,3'-, 3,4'- and 4,4'-(N-(3-chlorophthalimido))-(N-(4-chlorophthalimido))phenyl ether.

25. A method for preparing an aromatic polyether polymer which comprises contacting, in orthodichlorobenzene, substantially equimolar amounts of the disodium salt of bisphenol A having less than about 25% of particles with a diameter of greater than about 200 microns, and a bis((N-(chlorophthalimido))aromatic composition comprising 1,3- and 1,4-bis(N-(4-chlorophthalimido))benzene in the presence of hexaethylguanidinium chloride phase transfer catalyst.

26. The method of claim 1, wherein the alkali metal salt has an average particle size below about 100 microns.

27. The method of claim 24, wherein the alkali metal salt has an average particle size below about 100 microns.

28. The method of claim 25, wherein the alkali metal salt has an average particle size below about 100 microns.

29. The method of claim 1, wherein cyclic oligomer levels are less than about 5 wt. %.

30. The method of claim 24, wherein cyclic oligomer levels are less than about 5 wt. %.

31. The method of claim 25, wherein cyclic oligomer levels are less than about 5 wt. %.

* * * * *